United States Patent
Foster

(10) Patent No.: US 8,432,124 B2
(45) Date of Patent: Apr. 30, 2013

(54) PORTABLE ELECTRONIC DEVICE CARRIER WITH CHARGING SYSTEM

(75) Inventor: David A. Foster, Orange City, FL (US)

(73) Assignee: A&D Concepts, LLC, Miami, FL (US)

( * ) Notice: Subject to any disclaimer, the term of this patent is extended or adjusted under 35 U.S.C. 154(b) by 259 days.

(21) Appl. No.: 13/032,768

(22) Filed: Feb. 23, 2011

(65) Prior Publication Data

US 2011/0204843 A1 Aug. 25, 2011

Related U.S. Application Data

(60) Provisional application No. 61/338,920, filed on Feb. 24, 2010.

(51) Int. Cl.
*H01M 10/44* (2006.01)
*H02J 7/00* (2006.01)

(52) U.S. Cl.
USPC ............ 320/101; 320/107; 320/113; 320/115

(58) Field of Classification Search .................... 320/101
See application file for complete search history.

(56) References Cited

U.S. PATENT DOCUMENTS

| | | | |
|---|---|---|---|
| 5,052,943 A | 10/1991 | Davis | |
| 5,701,067 A * | 12/1997 | Kaji et al. | 320/101 |
| 5,855,692 A | 1/1999 | Kaji et al. | |
| 5,915,020 A * | 6/1999 | Tilford et al. | 455/3.02 |
| 6,184,654 B1 | 2/2001 | Bachner et al. | |
| 6,870,089 B1 | 3/2005 | Gray | |
| 6,977,479 B2 * | 12/2005 | Hsu | 320/101 |
| 7,295,865 B2 | 11/2007 | Wang | |
| 7,619,884 B1 | 11/2009 | Gray | |
| 2005/0140331 A1 | 6/2005 | McQuade | |
| 2006/0273757 A1 | 12/2006 | Ramez | |
| 2008/0210728 A1 * | 9/2008 | Bihn | 224/576 |
| 2009/0021214 A1 * | 1/2009 | Foster et al. | 320/114 |
| 2009/0102415 A1 * | 4/2009 | Muchow et al. | 320/101 |
| 2009/0160396 A1 * | 6/2009 | Shyu et al. | 320/101 |
| 2009/0284216 A1 | 11/2009 | Bessa et al. | |
| 2010/0093412 A1 | 4/2010 | Serra et al. | |
| 2011/0006725 A1 * | 1/2011 | Wilson | 320/101 |

\* cited by examiner

FOREIGN PATENT DOCUMENTS

| | | |
|---|---|---|
| JP | 10-137025 | 5/1998 |
| JP | 2001/149130 | 6/2001 |
| KR | 10-1999-0045804 | 6/1999 |
| KR | 10-2010-0082920 | 7/2010 |

OTHER PUBLICATIONS

PCT "Notification of Transmittal of the International Search Report and the Written Opinion of the International Searching Authority, or the Declaration for PCT/US2012/026117," mailed Sep. 27, 2012.

*Primary Examiner* — M'Baye Diao
(74) *Attorney, Agent, or Firm* — Weide & Miller, Ltd.

(57) ABSTRACT

A portable electronic device carrier supports and protects a portable electronic device while providing power to the device. The carrier is configured to house various portable electronic devices such as smart phones, cell phones, PDAs, tablets or the like. The carrier may comprise a foldable structure comprising two flaps or panels. One or more solar panels, batteries or both may provide power to a portable electronic device via a charging port that engages an interface of the portable electronic device. The carrier may include one or more retractable legs which support its panels relative to one another such that the portable electronic device may be held at various positions or angles which are well suited for different tasks. The carrier may include memory devices and various other ports to enhance the capabilities of the portable electronic device.

13 Claims, 12 Drawing Sheets

PORTABLE ELECTRONIC DEVICE CARRIER WITH CHARGING SYSTEM

CROSS-REFERENCE TO RELATED APPLICATION

This application claims priority to U.S. Provisional Patent Application No. 61/338,920, entitled Portable Electronic Device Carrier with Charging System, filed Feb. 24, 2010.

FIELD OF THE INVENTION

The present invention relates to electric chargers for portable electronic devices such as cell phones and PDAs.

BACKGROUND OF THE INVENTION

Cell phones, PDAs and other portable electronic devices are extremely prevalent. People are increasingly relying upon these devices for a range of purposes. For example, while cell phones were originally most commonly used by business travelers, they are now more widely used. For example, teens may carry cell phones in order to communicate with their parents in the event of an emergency, to communicate with their friends at school, or at home without tying up a home phone land line. In some cases, people are using their cell phone in replacement of their land lines. Similarly, PDAs have grown in popularity, owing to the range of functions they now provide.

One problem with these devices is, being portable, they are powered by a battery that requires frequent charging. Often, a user may find that their cell phone is not fully charged, and they may lose power during use. Loss of battery power to a PDA or cell phone can even result in loss of stored information.

Generally, these devices are charged by connecting them to a power source via a charging cable. Most commonly, these devices are provided with a "home" charging cable which allows the device to be charged via a 110V AC power source, such as the type commonly found in the home at a wall outlet. The device may also be provided with a "car" charger which allows the device to be charged via a 12V DC power source, such as the type commonly found in an automobile.

However, the device owner may forget their charger. For example, a traveler may forget to bring their home or car charger with them and arrive at a remote destination with no way to charge their device. Similarly, even if one charges their cell phone or PDA at home during the evening, the battery power may be depleted the next day when the device is used at school, at work or at another remote location. The user may then not be able to charge the device until they return home that evening.

One solution to this problem is to obtain an additional or backup battery. This battery may be charged at the same time as the main device battery and be transported with the device. If the main battery loses its charge, the second battery may be placed in the device. This, however, is a cumbersome solution to the problem. The solution requires one to purchase an expensive battery and keep that battery, like the battery in the main device, charged up. If one travels for a few days, the charge in both batteries may quickly be depleted, leaving the user without use of their device once again.

SUMMARY OF THE INVENTION

A portable electronic device carrier includes a charging system. The carrier is configured to at least partially house a portable electronic device such as a cell phone, music device, iPod, iPad, camera, PDA, tablet computing device, video game system, audio/video device, GPS unit, a laptop or other computer, or the like. The carrier may comprise a foldable structure or have various other configurations.

A variety of carriers are disclosed herein. For example, in one embodiment a carrier may comprise a foldable structure comprising a first panel and a second panel. The first panel and second panel may be rotatable between a closed position and one or more open positions relative to one another. An interior side of the first panel may be adjacent an interior side of the second panel when the foldable structure is in the closed position. The two panels may be formed from a rigid material.

An interior recess may be in at least one of the two panels configured to accept the portable electronic device therein. At least one charging port may be at the interior recess and electrically coupled to the solar panels. The at least one charging port may be configured to provide electricity to the portable electronic device. The at least one charging port may be positioned at a wall of the interior recess such that the at least one charging port is automatically coupled with a mating port of the portable electronic device as the portable electronic device is inserted into the interior recess.

The exterior side of the first panel and the exterior side of the second panel may define an exterior surface of the carrier. One or more solar panels may be mounted to the exterior surface. One or more retractable legs configured to extend and retract from the exterior surface may be mounted to the exterior surface.

At least one of the retractable legs may be mounted to the exterior surface at the proximal end of the second panel. Alternatively or in addition, at least one of the retractable legs may be mounted to the exterior surface at the distal end of the second panel. The retractable legs may be rotatably mounted to the exterior surface such that the retractable legs may rotate from a retracted position wherein the retractable legs are adjacent the exterior surface and to an extended position wherein the retractable legs extend outward from the exterior surface. It is noted that the retractable legs may each be mounted within a recess in the exterior surface.

In another exemplary embodiment, a portable electronic device carrier may comprise a first panel configured to cover a first side of the portable electronic device, and a second panel comprising a raised peripheral portion to form a recess for accepting a second side of the portable electronic device. One or more rotatable mounts may attach the first panel to the second panel such that the first panel and second panel are rotatable relative to one another via the rotatable mounts. One or more retractable legs may be mounted to an exterior side of the second panel, such as at a distal or proximal end of the second panel.

One or more solar panels mounted to an exterior side of the first panel. For example, an exterior side of the first panel may have a recess and wherein the solar panels are mounted within the recess.

At least one charging port may be at the recess and electrically coupled to the solar panels. The at least one charging port may be configured to provide electricity to the portable electronic device. At least one of one or more externally accessible data ports may be electrically coupled to the charging port to communicate data with the portable electronic device. It is noted that the externally accessible data ports may be various types of ports including one or more HDMI ports, USB ports, memory card readers, optical data ports, and electrical power ports.

Other electronic components may be included as well. For instance, a memory device configured to store data may be in electrical communication with at least one of the externally accessible data ports. In addition, a video and audio output device, such as an HDMI output device may be provided. The video and audio output device may accept input (typically a video signal) from the portable electronic device, and process the input to produce digital audio and video output. The output may be produced according to a standard, such as the HDMI format/standard. The video and audio output device may be connected to an output port, such as HDMI port. In this manner, the portable electronic device may output HDMI signals to an external device, such as a television, display, audio device, or the like.

Methods for supporting and powering a portable electronic device with a portable electronic device carrier are also disclosed herein. In one exemplary embodiment, such a method may comprise providing a foldable structure comprising a first panel and a second panel wherein the first panel and second panel are rotatable between a closed position and one or more open positions relative to one another. An interior side of the first panel may be adjacent an interior side of the second panel when in the closed position.

An interior recess configured to accept the portable electronic device may be formed in at least one of the two panels. At least one charging port may be provided at the interior recess. One or more solar panels may be mounted to an exterior surface of at least one of the two panels. The at least one charging port may be electrically coupled to the solar panels. A memory device may be mounted to at least one of the two panels. Data may be communicated with a memory device from the portable electronic device via the at least one charging port.

One or more retractable legs may be mounted to the exterior surface of at least one of the two panels. Similar to above, the retractable legs may extend and retract from the exterior surface.

The method may also comprise extending at least one of the retractable legs, and moving the at least one retractable leg such that both ends of the at least one retractable leg is in contact with at least one of the two panels. This contact allows the at least one retractable leg to hold the two panels in position relative to one another.

It is noted that moving the at least one retractable leg may comprise rotating the first panel relative to the second panel such that the first panel and the second panel are in a non-parallel angle relative to one another. Extending the at least one retractable leg may comprise extending a retractable leg at a proximal end or at a distal end of at least one of the two panels. Extending a retractable leg at the proximal end of at least one of the two panels may hold the two panels in a first open position, while extending a retractable leg at the distal end of at least one of the two panels may hold the two panels in a second open position that is distinct from the first open position. This allows the carrier to hold a portable electronic device in different positions, such as an upright position and a reclined position each of which may be well suited for particular tasks.

Further objects, features, and advantages of the present invention over the prior art will become apparent from the detailed description which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a carrier for a portable electronic device, the carrier having a charging system. In one embodiment, the charging system comprises at least one battery. In another embodiment, the charging system comprises a solar or photovoltaic unit. In another embodiment, the charging system comprises at least one battery and a solar or photovoltaic unit.

As used herein, the term "portable electronic device" (or PED) may comprise any of a variety of devices now know or later developed which include their own limited power supply, such as a re-chargeable battery, which power supply must be re-charged from an external source. Such devices may comprise, but are not limited to cell phones, PDAs, portable music devices, iPods, iPads, GPS units, laptop and other computers, video game systems, video players, cameras and other devices.

Figure 1:
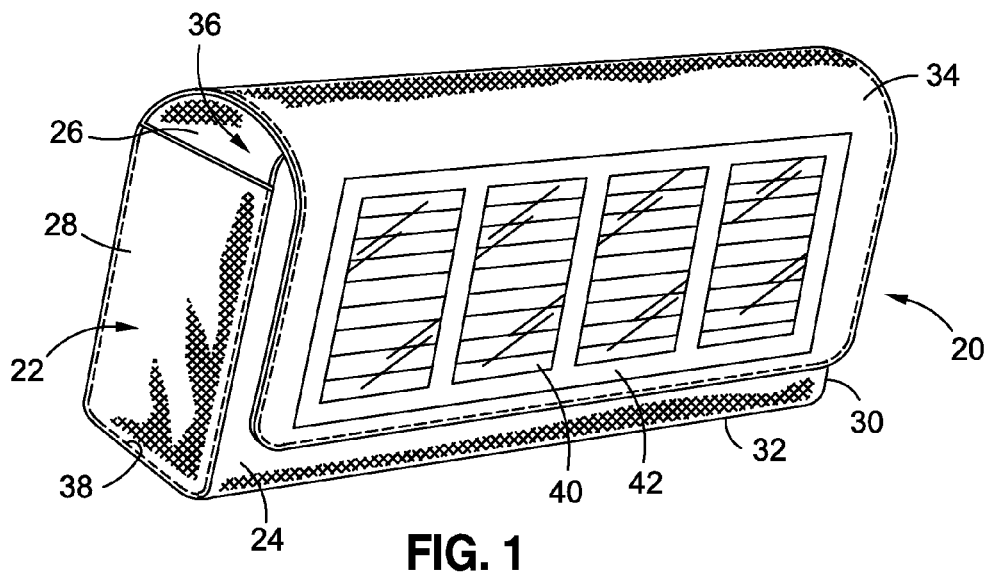
FIG. 1 is an external perspective view of a portable electronic device carrier and a charging system in accordance with an embodiment of the invention.

FIG. 1 illustrates a PED carrier 20 in accordance with one embodiment of the invention. The carrier 20 may have a variety of shapes, sizes and features, such as depending upon the one or more PEDs it is intended to be used with. In general, the carrier 20 is preferably configured to house or contain at least a portion of a PED, such as for storage or transport.

Figure 2:
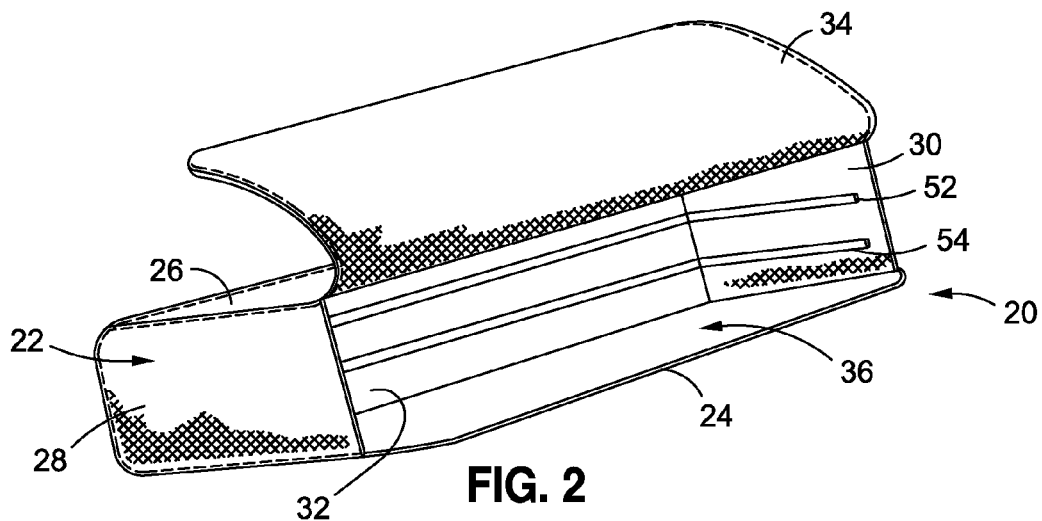
FIG. 2 is a perspective view of the portable electronic device carrier illustrated in FIG. 1 with a flap thereof in an open position, exposing an interior of the carrier.
Figure 3:
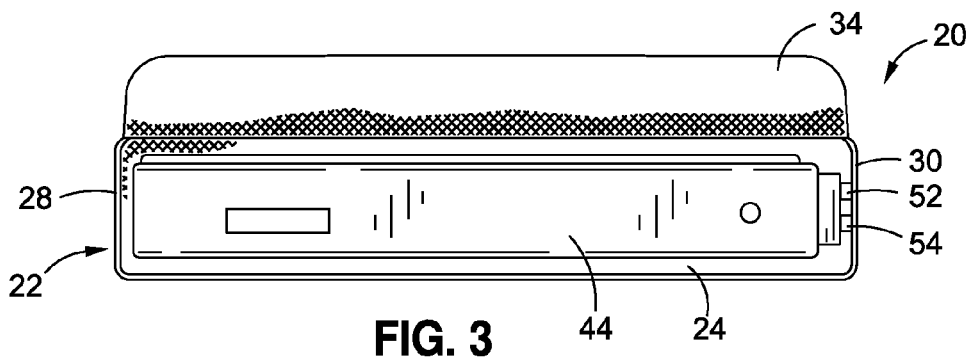
FIG. 3 is a top view of another embodiment portable electronic device carrier.

FIGS. 1-3 illustrate a carrier 20 particularly suited for use in housing a cell phone. In this configuration, the carrier 20 has the form of a pouch configured to contain a cell phone. As illustrated, the carrier 20 has a body 22 having a front 24, a rear 26, a first end 28, a second end 30, a bottom 32, and a flap 34 which serves as a top. The front 24, rear 26, first end 28, second end 30 and bottom 32 preferably define a generally rectangular enclosure having an interior area 36. Each of the front 24, rear 26 first end 28 and second end 30 have a bottom portion which is connected to the bottom 32. A top end of the front 24, first end 28, and second end 30 extend to an otherwise open top. This open top may be selectively covered by the flap 34. As illustrated, the flap 34 is integral with the rear 26 of the carrier 20.

As illustrated in FIG. 1, the flap 34 may be folded upwardly and/or backwardly to open the body 22, providing access to the interior area 36. Alternatively, the flap 34 may be folded over forwardly and/or downwardly to the position illustrated in FIG. 1. At that time, the flap 34 generally closes the top of the interior area 36, the flap 34 extending over a front portion of the front 24 of the body 22.

In one embodiment, the body 22 may be constructed from a fabric material or a reinforced fabric material. The body 22 may be constructed of a wide range of materials, however. In one embodiment, various portions of the body 22 may be constructed as discrete panels, which panels are connected by stitching 38.

In one embodiment of the invention, the carrier 20 includes a charging system. The charging system is configured to provide power to a PED, preferably for charging a power supply, such as a rechargeable battery, thereof. As indicated below, the charging system may comprise an electrical circuit and various components.

Figure 4:
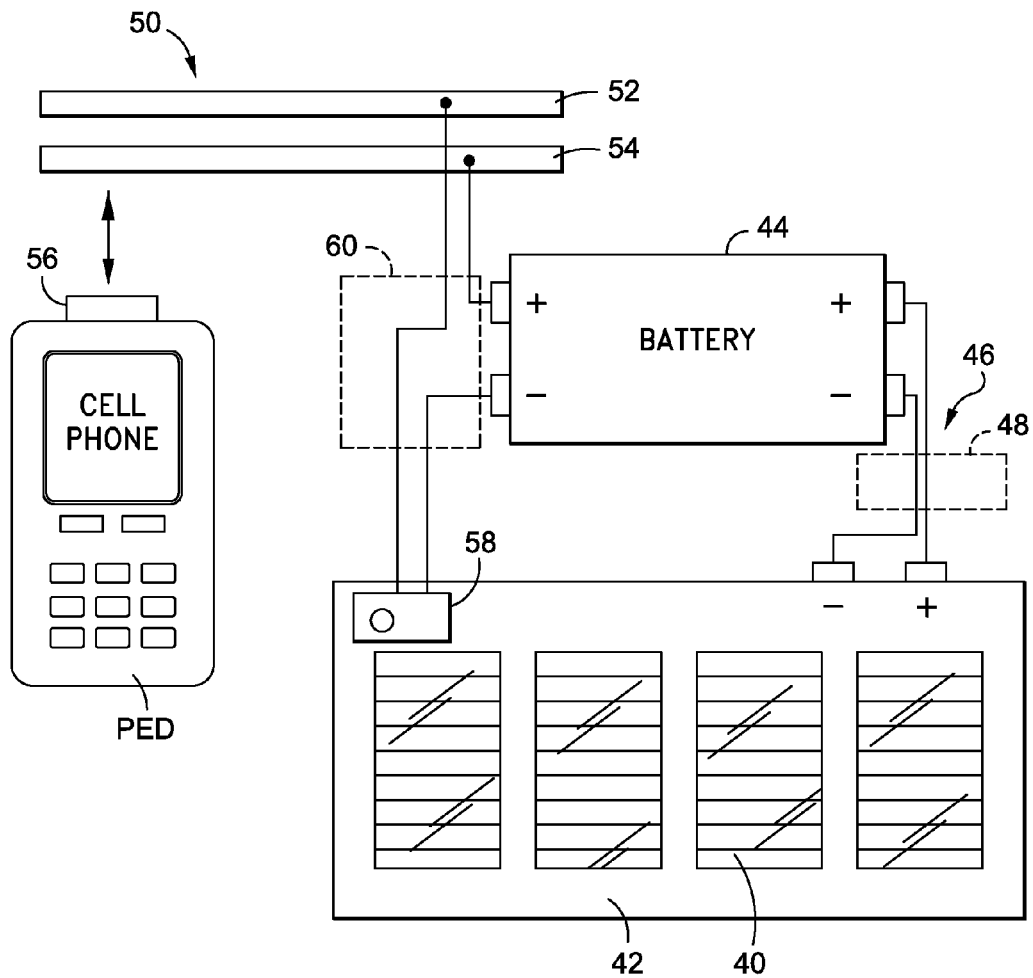
FIG. 4 schematically illustrates a charging system configuration in accordance with a solar powered embodiment of the invention.

Referring to FIG. 4, the charging system includes a power source. This power source is preferably configured for use in charging a power source of a PED. In one embodiment, the power source is portable, meaning that it is configured to generate or provide power without connection to an external power source. In a preferred embodiment, the power source comprises one or more photovoltaic or solar cells 40. Such cells 40 may have a variety of configurations now known or later developed. Preferably, however, such cells 40 are configured convert light, such as solar energy, into electricity. In one embodiment, the carrier 20 may include a module or unit of two or more cells 40. For example, the carrier 20 is illustrated as including a panel 42 which includes four cells 40.

Preferably, the power source is associated with the carrier 20 so as to be transported therewith. In the embodiment where the power source comprises one or more photovoltaic cells 40, the cells 40 are preferably associated with an exterior portion of the carrier 20, whereby the cells 40 will be exposed to light. For example, in the embodiment illustrated in FIG. 1, the carrier 20 is configured to be mounted on a belt, and may thus include a mount (not shown) at the rear thereof. In that embodiment, the front of the flap 34 generally faces outwardly from the wearer of the carrier, towards light. Thus, in one embodiment, the cells 40 are located on a front portion of the flap 34. Of course, the cell(s) 40 may be located at other portions of the carrier 20 to accomplish the desired purpose. In one embodiment, cells 40 may be located at more than one portion of the carrier 20 (such as both the front and rear, the top and sides or the like). In this manner, the cells may be exposed to light from a variety of positions or directions.

The one or more cells 40 are preferably mounted to the carrier 20. The cell(s) 40 may be removably connected (such as with hook and loop fastener) or be permanently connected (such as with adhesive, by sewing, by trapping edge portions of the panel between layers of the body 22 of the carrier 20 or the like).

In one embodiment, the charging system includes a battery 44. The one or more solar or photovoltaic cells 40 (as illustrated, four cells 40 common to the panel 42) are configured to generate electricity or power when exposed to light. In a preferred embodiment, this power is used to charge the battery 44. Power may be supplied to the battery 44 by appropriate conductors 46, such as wire leads.

In a preferred embodiment, the battery 44 is associated with the carrier 20, such as by being mounted thereto. For example, the battery 44 may be mounted to or be mounted within the body 22 of the carrier 20. Preferably, the battery 44 is relatively small and lightweight and is configured to be rechargeable.

In one embodiment, a controller 48 may be utilized to control the flow of electricity to the battery 44, thus controlling the charging thereof. This controller 48 may be configured, for example, to ensure that the battery 44 is not overcharged or the like.

In one embodiment, the charging system includes a charging port 50. The charging port 50 preferably comprises an interface or link between a power source and a PED. As illustrated, the charging port 50 is coupled to the battery 44 (which as indicated above is, in turn, coupled to the cells 40).

The charging port 50 may have a variety of configurations. In one preferred embodiment, the charging port 50 comprises a first contact 52 and a second contact 54 having at least a portion configured as an electrical conductor. Referring to FIG. 2, in one embodiment the first and second conductors 52,54 comprise elongate leads or wires.

The charging port 50 may be connected to the power source in various manners. In the embodiment illustrated, a first conductor, such as a wire, leads from one of the terminals of the battery 44 to the first contact 52, and a second conductor, such as a wire, leads from the other of the terminals of the battery to the second contact 54.

The charging port 50 is configured to be engaged by a PED so that power is supplied from the power supply to the PED. In one embodiment, the PED includes an interface 56 for this purpose. The charging port 50 may be plugged into an appropriate interface 56 of the PED or vice versa. The interface 56 is preferably configured to engage the first and second contacts 52,54.

In one embodiment, as illustrated in FIG. 2, the charging port 50 may be configured to be engaged by the PED automatically when the PED is located in the carrier 20. For example, in one embodiment, the first and second contacts 52,54 may be configured to extend along one or more portions of the inside of the carrier 20, such as the bottom 32 and first and second sides 28,30. When a PED such as that illustrated in FIG. 4 having an interface 56 located at a first end thereof is located in the carrier 20, the interface 56 will engage the first and second contacts 52,54 automatically.

In other embodiments, the user may be required to connect the PED to the charging port 50. For example, the charging port 50 might comprise a connector located at the end of a pair of leads extending from the battery 44. The user may be required to plug the connector into a port of the PED. The charging port 50 may have other configurations for mating with one or more other types or configurations of PED interfaces. In one embodiment, the PED need not physically contact the charging port 50. For example, the charging port 50 may be configured to generate an energy field. The PED may be configured to generate electricity from the field. For example, the PED may include an interface having a coil which, when located in the field, generates electricity which may be utilized to charge the battery of the PED.

In one embodiment, the charging system may be configured to provide an indication to a user that the PED is being charged. In one embodiment, a visible indicator may be provided. As illustrated, in FIG. 4, the visible indicator may comprise an LED 58. In one embodiment, the LED 58 is placed in the circuit with the charging port 50 and power source, such as the battery 44, whereby when the charging circuit is complete, currently flows through the LED 58, thus causing it to illuminate. When the circuit is incomplete, such as when the PED is disconnected from the charging port 50, the LED 58 ceases to illuminate because no current flows thereto.

Of course, the indicator may have other configurations. For example, the indicator may be other types of visible indicators, such as other types of lights. The indicator might even comprise a display. The indicator could alternately, or in addition, comprise an audible indicator such as a speaker configured to output audible sound, such as a tone. The indicator could also be activated in other manners.

In one embodiment, the charging system may include a controller 60 for controlling the charging process, such as by controlling the flow of electricity to the PED. The controller 60 may also provide other control functions, such as controlling the LED 58 or other visual indicator.

FIG. 3 illustrates an embodiment of the invention where certain of the components of the charging system are illustrated as located within the carrier 20. As illustrated, the battery 44 may be located in the bottom of the carrier 20, with the first and second contacts 52,54 of the charging port 50 extending upwardly along one of the sides of the carrier. Of course, the components of the charging circuit could be associated with the carrier 20 in other manners.

In one embodiment, the PED interface (and/or the charging port) may be configured to ensure that the PED can be mated with the charging port only in the correct manner. For example, the PED interface may be non-symmetrical to ensure that it can only be engaged with the charging port in one orientation (thus preventing, for example, mating in an incorrect position and potential shorting out of the battery 44 or the PED).

The charging system may have a variety of other configurations, including other components. In one embodiment, for example, the system need not include a battery, or might include more than one battery for storing power for later use in charging a PED.

In use, the cells 40 are exposed to light. This might occur when the carrier 20 is located in an office, located on the dash of a car, worn on a belt outdoors, or a variety of other instances. Upon exposure to the light, the cells 40 generate electricity which is used to charge the battery 44. The battery 44 preferably provides a DC power supply for use in charging another device, such as a PED.

Figure 5:
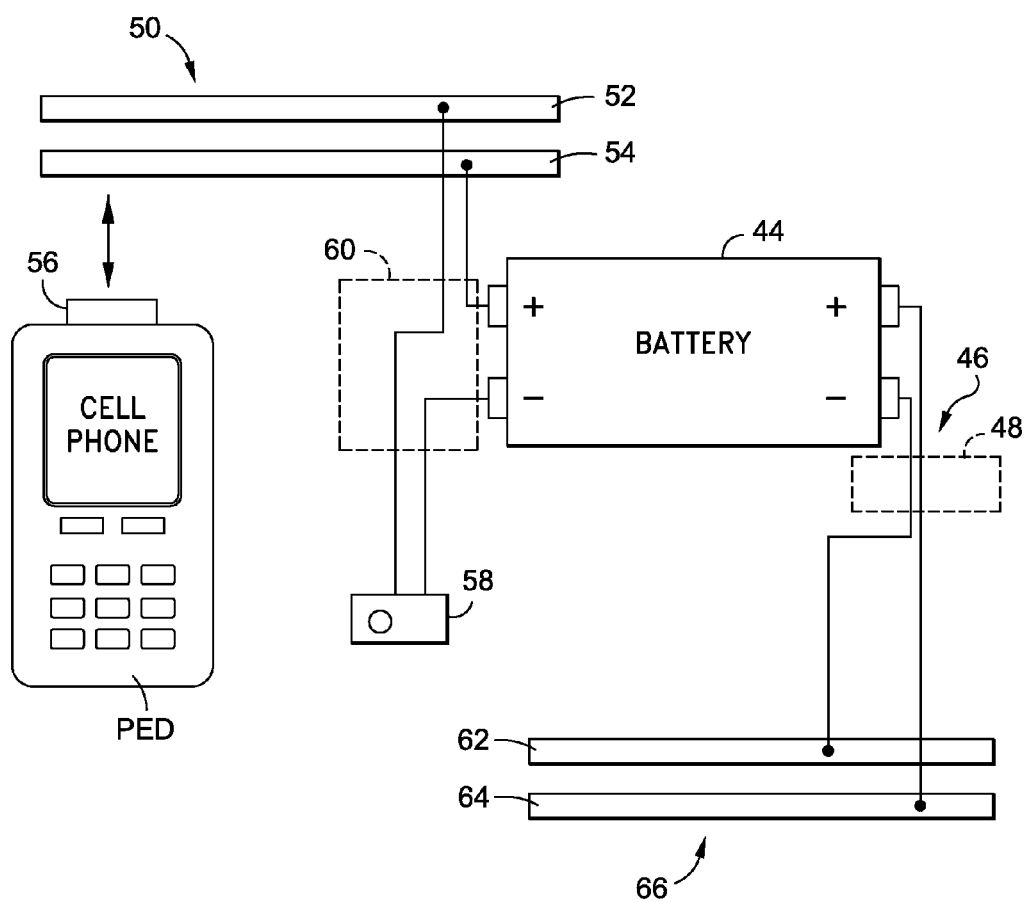
FIG. 5 schematically illustrates a charging system configuration in accordance with an externally powered embodiment of the invention.

In accordance with another embodiment of the invention, the charging system need not include a solar or photovoltaic cell, but rather a battery may be configured to be charged with one or more other external sources of power. FIG. 5 illustrates such an embodiment, wherein the external source or sources of power are used to charge at least one battery 44 through appropriate conductors 46, such as wire leads.

As with above, in one or more embodiments, the battery 44 is associated with the carrier 20, such as by being mounted thereto. For example, the battery 44 may be mounted on or in the body 22 of the carrier. Many types of batteries may be used with the charging system, however it is preferred that the battery 44 be rechargeable, small, and lightweight. In other embodiments, the charging system may utilize non-rechargeable batteries such as alkaline. In these embodiments the battery 44 is not recharged but replaced with a new battery once its power has been expended.

Similar to FIG. 4, FIG. 5 also illustrates a charging port 50 which, in one or more embodiments, forms an interface linking a power source, such as the battery 44, and a PED. The charging port 50 may have various configurations. In one embodiment, the charging port comprises a first contact 52 and a second contact 54 having at least a portion thereof configured as an electrical conductor. The charging port 50 may comprise elongated leads or wires, or may be configured to be engaged by a PED such as by engaging the interface 56 of a PED. Various PEDs have various interfaces 56 and thus it is contemplated that the charging port 50 can come in a similar variety of configurations and be easily disconnected and reconnected from a PED's interface 56. In addition, the PED interface 56 and/or the charging port 50 may be configured to ensure that the PED can only be mated with the charging port in the correct manner. Thus, the PED interface 56 may be non-symmetrical, for example, to ensure that it can only be engaged in the correct orientation. This is advantageous in that it prevents the battery 44 from being shorted out and prevents damage to the PED from engaging the charging port 50 incorrectly.

As shown in FIG. 2, the charging port 50 may be configured to be engaged by the PED automatically when the PED is placed in the carrier 20. The first contact 52 and the second contact 54 may be arranged to extend along one or more portions of the carrier 22, such as its bottom 32 and/or its first side 28 or second side 30. Thus, when a PED, such as illustrated in FIG. 5, is placed in a carrier 20 the PED's interface 56 will engage the first and second contacts 52,54 automatically.

In other embodiments, physical contact with the PED may not be necessary to charge the PED. For example, the charging port 50 in one or more embodiments, may be configured to generate an energy field. The PED may include an interface 56 with a coil which generates electricity when the PED is within the field. This electricity may then be used to charge the PED's battery.

The charging port 50 may be connected to the power source in various ways. In the embodiment of FIG. 5, a first conductor connects one of the terminals of the battery 44 to the first contact 52, and a second conductor connects the other terminal of the battery 44 to the second contact 54. The conductors in one or more embodiments may be conductive leads such as wires or other conductive material.

Similarly, the battery 44 may be connected to an external power source in various ways. In one or more embodiments, the charging system includes an external port 66. The external port 66 of one embodiment comprises at least one connector, such as a first lead 62 and a second lead 64, but other embodiments may utilize different configurations. For example and as described below, the external port 66 may be configured to interface or link to a specific connector of a specific external power source such as a plug for a standard wall outlet. In addition, the external port 66 may be a coil or similar apparatus which generates power in the presence of an energy field produced by an external power source.

In some embodiments, the external port 66 may be stored in the carrier 20 when not in use and removed from the carrier when in use. For example, the external port 66 may have an electrical cord or cords as its conductors which allow the external port to be taken out of the carrier 20 and plugged in to an external power source such as a wall outlet. Each electrical cord is insulated such that it may be used outside the carrier and manipulated safely by users. In this example, the carrier's flap 34 may be opened so that the external port 66 may be taken out and plugged in to a wall outlet. Alternatively, in some embodiments, the external port 66 may extend through and retract back into an opening in the carrier 20 configured for the external port.

In other embodiments, the external port 66 may be on the exterior of the carrier 20. For example, the external port 66 may be mounted on the exterior of the carrier 20 and attach to one or more external power sources when in use. In one embodiment, the external port 66 may comprise a wall outlet plug which flips out to plug into to a wall outlet. In another embodiment, the external port 66 may be attached to one or more electrical cords extending from the interior to the exterior of the carrier 20. The charging system may then be recharged by placing it near an external power source and then connecting the external port 66 to the interface or leads of the power source.

A primary conductor connects one recharge terminal of the battery 44 to a first lead 62, and a secondary conductor connects another recharge terminal of the battery 44 to a second lead 64. It is contemplated that additional recharge leads, such as a ground, may be present in one or more embodiments of the invention. Further, in some embodiments, a controller 48 may be used to control the charging and/or recharging of the battery 44. In this manner, the controller 48 may be used to ensure that the battery 44 is properly charged and not damaged such as by overcharging or the like.

Generally, an external power source will be connected to the charging system by connecting the leads or terminals of the external power source to the first and second leads 62,64 or other connector of the charging system. Power from the external power source can then recharge the battery 44 through the conductors described above. The first and second leads 62,64 may be configured to accept or connect to various power sources. For example, the first and second leads 62,64 may be configured as a standard wall plug to be plugged in to a standard AC wall outlet or automobile 12V outlet. The first and second leads 62,64 may also be configured with traditional, known, proprietary, or future developed interfaces so that power can be obtained from external or other power sources.

It is contemplated that the external power source may be any power. It is also contemplated that one or more external power sources may be used simultaneously or alone with the charging system. The external power sources may be any power source now known or later developed including but not limited to photovoltaic or solar panels, external batteries, wall outlets, or human or motion generated electricity.

Finally, it is also contemplated that in one or more embodiments the battery 44 may be removable from the charging system and independently recharged and reconnected to the charging system. In addition and as stated above, the battery 44 in some embodiments may not be rechargeable and thus would be used, discarded, and replaced with a new battery 44 as necessary. In such a configuration, the charging system need not include an external port or connector.

In some embodiments, an indication to the user that the PED is being charged may be provided. In one embodiment, a visible indicator such as a LED 58 may be provided. The LED 58 may be placed in the circuit such that when the charging circuit is complete, current flows through the LED 58 causing it to illuminate. When current ceases to flow through the LED 58 it correspondingly ceases to illuminate. Other types of indicators may be used as well such as but not limited to a display, blinking lights, speakers, sounds, and/or tones. These an other indicators may be activated in response to charging as described or in response to one or more other events such as when the charge is complete or when the battery 44 is low.

As described with reference to FIG. 4, the controller 60 controls the charging process such as by controlling the flow of electricity to a PED. The controller 60 may also provide other control functions such as controlling the LED 58 or other indicators.

As with the embodiment of FIG. 3, the components of the embodiment in FIG. 5 may be located within a carrier 20. Of course, the components of the charging system may be associated with the carrier 20 in other ways. In addition, the charging system may have a variety of other configurations, including other components.

A user may charge the battery or batteries of their PED by simply associating the PED with the carrier 20. The PED is associated with the charging port 50. As indicated, in a preferred embodiment, this may comprise engaging an interface 56 of the PED with contacts 52,54 of the charging port 50 when the PED is located in the carrier 20.

Once connected to the charging port 50, electricity is provided to the PED from the battery 44. In embodiments where there is not battery, electricity may be provided to the PED from one or more external power sources providing electricity to the external port 66. Preferably, charging status is indicated to the user, such as via the LED 58.

In accordance with the invention, a charging source is conveniently provided for a PED. The charging source does not require a standard external fixed power source such as a home or office AC outlet or a car DC outlet. Further, the power source is conveniently associated with a carrier for the PED. PEDs are commonly transported in their carriers. In accordance with the invention, when the PED is being transported or stored, it is also charged.

Figure 6:
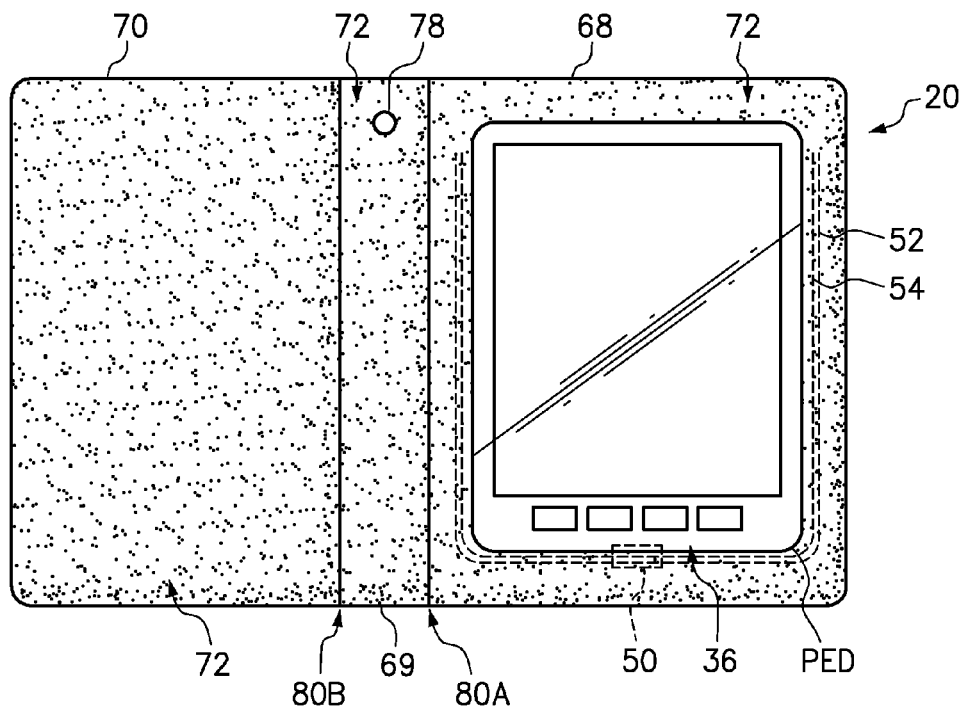
FIG. 6 illustrates yet another embodiment of a portable electronic device carrier in an open position.
Figure 7:
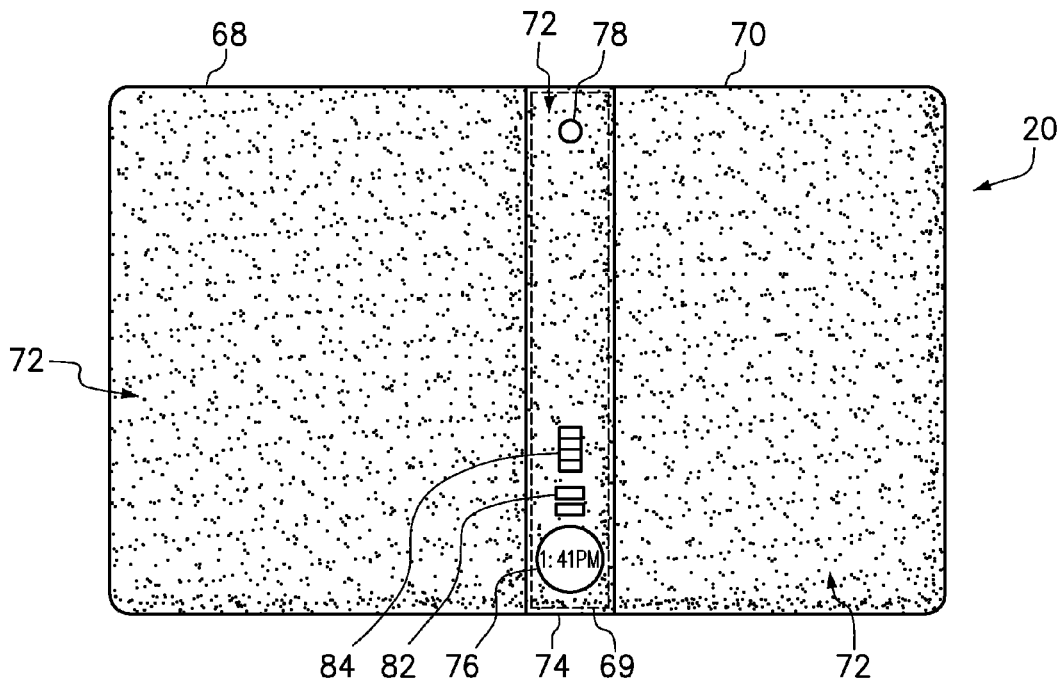
FIG. 7 is a rear view of the portable electronic device carrier of FIG. 6.

As indicated, the carrier 20 may have a variety of other configurations. In another configuration, the carrier 20 is particularly adapted for accepting a generally planar PED. Referring to FIGS. 6 and 7, in some embodiments, the carrier 20 may be configured similar to a notebook, whereby the carrier 20 may have open and closed positions. In an "open" position, a PED may be accessible while in the carrier. For example, the carrier 20 may be configured to provide access to a screen, one or more input devices (e.g., buttons, touch screen, microphone, camera, etc. . . . ), or the like of a PED while the PED is within the carrier 20. This allows the carrier 20 to protect the PED and provide power (and other features) to the PED while permitting a user to access and use the PED. In a "closed" position, the carrier may generally protect or enclose the PED.

Figure 8:
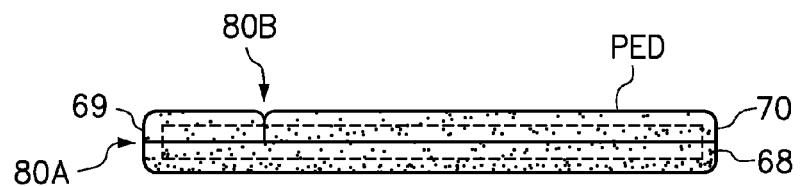
FIG. 8 is an end view of the portable electronic device carrier of FIG. 6 when in a closed position.
Figure 9:
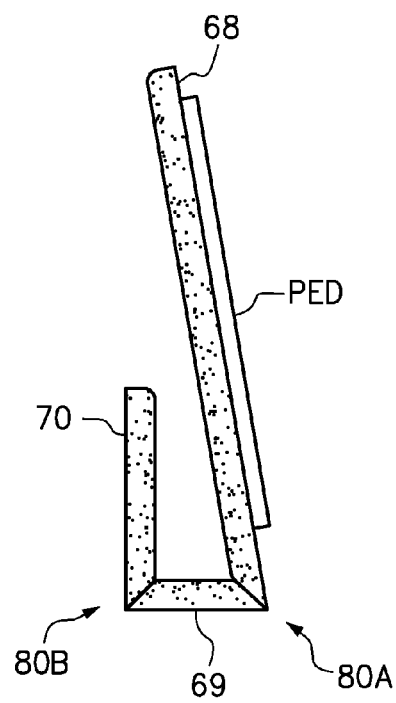
FIG. 9 is an end view of the portable electronic device carrier of FIG. 6 in a folded position.

As illustrated in FIGS. 6-7, the carrier 20 may comprise a foldable structure which may be manipulated to from a closed position in which it generally encloses the PED to an open position wherein the PED is accessible for use. For example, the carrier 20 may comprise a first, bottom or rear flap or panel 68 and a second, top or front or panel 70. Preferably, the carrier 20 may be folded about one or more articulation lines 80 or hinges/folds so as to move between the "open" and "closed" positions. To illustrate, as shown in FIG. 6, the carrier 20 has been opened to permit convenient access to the PED. FIG. 8 illustrates the carrier 20 folded at articulation line 80A to enclose the PED within the carrier. It is noted that there may be various open and closed configurations for the carrier 20. For instance, the carrier 20 may comprise multiple articulation lines 80 which allow for various open and closed positions or configurations of the carrier. FIG. 9 illustrates one such configuration where the carrier 20 has been opened by folding or bending the carrier's panels 68,70 at a first and second articulation line 80A,80B. Such a configuration may permit the carrier 20 to act as a stand, such as to support the PED in an upright and outwardly extending position for viewing (such as when the carrier 20 is resting upon a planar supporting surface).

As discussed above, the carrier 20, such as its panels 68,70 may comprise various materials. For example, the panels 68,70 might comprise a base or substrate material. Such a material might be rigid or flexible. In order to protect a PED therein, the panels 68,70 may comprise a padded material or include padding (such as padding located over a rigid substrate). In one embodiment, the panels 68,70 might have an outer protective material, such as a vinyl, leather or other surface. For example, the carrier 20 may comprise a cardboard of or plastic substrate, one or more resilient materials which cushion the PED and protect the PED from damage, and an outer protective vinyl layer. The articulation lines 80A,80B may comprise hinges or similar elements. For example, the articulation lines 80A,80B might comprise areas of flexible connecting materials between the panels 68,70 or portions thereof. In this regard, as detailed herein, there may be more than two panels or the panels may have multiple portions, the panels and/or portions thereof hinged or articulated in various manners.

In a preferred embodiment, the panels 68,70 are generally planar. However, in one or more embodiments, one or both panels 68,70 may have downwardly extending free edge portions. These edge portions may serve to enclose the edge portions of the carrier 20 in its closed position (when accounting for the thickness of a PED located between the panels 68,70).

Referring back to FIG. 6, the carrier 20 may comprise or define an interior area 36 which may be configured to accept a PED. In one embodiment, the panels 68,70 may be generally planar. In such a configuration, the carrier 20 may define an interior area when the panels are moved to a closed position. In such a configuration, a PED may be associated with a face of one of the panels, such as the rear panel 68, and then the front panel 70 may be folded over the rear panel 68 and the PED to enclose the PED.

In another embodiment, the carrier 20, such as one panel 68,70 thereof, may define a recessed area for a PED. For example, the rear panel 68 may define a depression configured to accept the PED and the top panel 70 may be configured to fold over and cover the PED. Preferably, the carrier 20 is configured to extend over and around the PED to house or contain the PED, such as by having the edge portion of the panels 68,70 extend outwardly beyond the PED, as best illustrated in FIG. 6. As indicated above, a depression or interior area may also be defined by one or both panels 68,70 having inwardly extending edge portions (to form a "clamshell" type enclosure). At the same time, when the carrier 20 is in its open position, the PED (such as a front face thereof) is preferably accessible to the user. In order to accommodate a PED therein, the two panels 68,70 may be connected by a spine portion 69 or one of the panel 68,70 may define such a portion in order to permit the two panels to be folded over one another (while accommodating the thickness of the PED).

In one embodiment, a PED may simply be placed on or inside the carrier 20. In another embodiment, the carrier 20 may include means for securing a PED thereto. For example, one or more threaded connectors (such as screws) may be used to couple the carrier 20 and mating threaded connectors on the back or other portion of a PED. The PED may be secured by one or more adhesives in some embodiments. In other embodiments, hook and loop fasteners, one or more straps, or the like may be used to secure the PED. The carrier 20 might also define a pocket having portions which grip or engage top, bottom and/or side portions of the PED. It is contemplated that a transparent cover may be positioned over the PED to secure the PED at the interior area 36 as well in one or more embodiments. The transparency of the cover allows a user to view the screen of the PED as well as various cameras, buttons, and other input devices while the PED is secured within the carrier 20.

One or more charging ports 50 may be associated with the carrier 20. As discussed above, the charging ports 50 may be configured such that a connection between a PED and a charging port 50 having one or more leads may be automatically made as the PED is placed into the interior area 36 of the carrier 20. For instance, a first and a second lead 52,54 (and additional leads) may be formed into the interior area 36. In FIG. 6 for example, a first and second lead 52,54 may be elongated and/or wrap around the interior area 36. These leads 52,54 may be exposed (and for example, comprise wires or planar strips) so that a charging interface of a PED may automatically contact the leads 52,54 when the PED is located in the carrier 20. In one or more embodiments, the PED may have an interface 56 connected thereto to permit this connection to be made (such as an interface member which plugs into a charging port of the PED and which extends outwardly there from and defines contacts for engaging the leads 52,54). As can be seen from FIG. 6, the first and second lead 52,54 allow a connection with an interface 56 at the bottom of the PED. Because the first and second leads 52,54 may be configured in various ways, the interface 56 may be at different locations on a PED and still connect to the charging port's leads.

It is noted that in some embodiments, the leads of a charging port 50 may correspond to a connector or interface 56 of a PED. In these embodiments, the leads need not be elongated or wrap around the interior area 36 as they may be configured for one or more particular PEDs. For example, the carrier 20 may define a plug or the like which is configured to be pressed into engagement with a charging portion of the PED.

As stated above, power may be supplied to a PED from various power sources. In some embodiments, the carrier 20 may comprise one or more solar cells, batteries, or both to provide power to a PED via the charging port 50. For example, one or more solar cells might be mounted to the exterior the panels 68,70 of the carrier.

In a preferred embodiment, a photovoltaic coating or ink is used to provide power from the sun or other light sources to the PED. For instance, as can be seen from FIG. 7, the back or other portion(s) of the carrier 20 may be coated with photovoltaic ink 72 to collect solar energy. The photovoltaic ink is highly beneficial in that it may be applied to some, a substantial portion, or all of the carrier's outer surface(s). In this manner, the surface areas of the carrier 20 which are capable of collecting solar energy may be maximized. For example, photovoltaic ink 72 may be applied to the front of the top panel 70 (so as, for example, to receive light when the carrier 20 is in its closed position and resting on a support surface), to be applied to the back of the bottom panel 68 (so as, for example, to receive light when the carrier 20 is in its closed position and resting on the top panel 70), or be applied to the inside surface of the top panel 70 and/or the front surface of the bottom panel 68 (so as, for example, to receive light when the carrier 20 is in its open position).

The photovoltaic ink 72 may be applied to the panels 68,70 or comprise a thin film material (i.e. have a supporting structure) which is connected thereto. For example, the photovoltaic ink 72 may comprise a thin layer material which is adhered onto the panels 68,72 or placed within covering sheets or the like of the panels 68,70. Such ink 72 or ink layers may be flexible in one or more embodiments to facilitate folding of the carrier 20 or the like without damaging the energy collector(s). Because the photovoltaic ink 72 may be flexible, even portions of the carrier 20 that bend, fold or flex may be coated covered.

Figure 10:
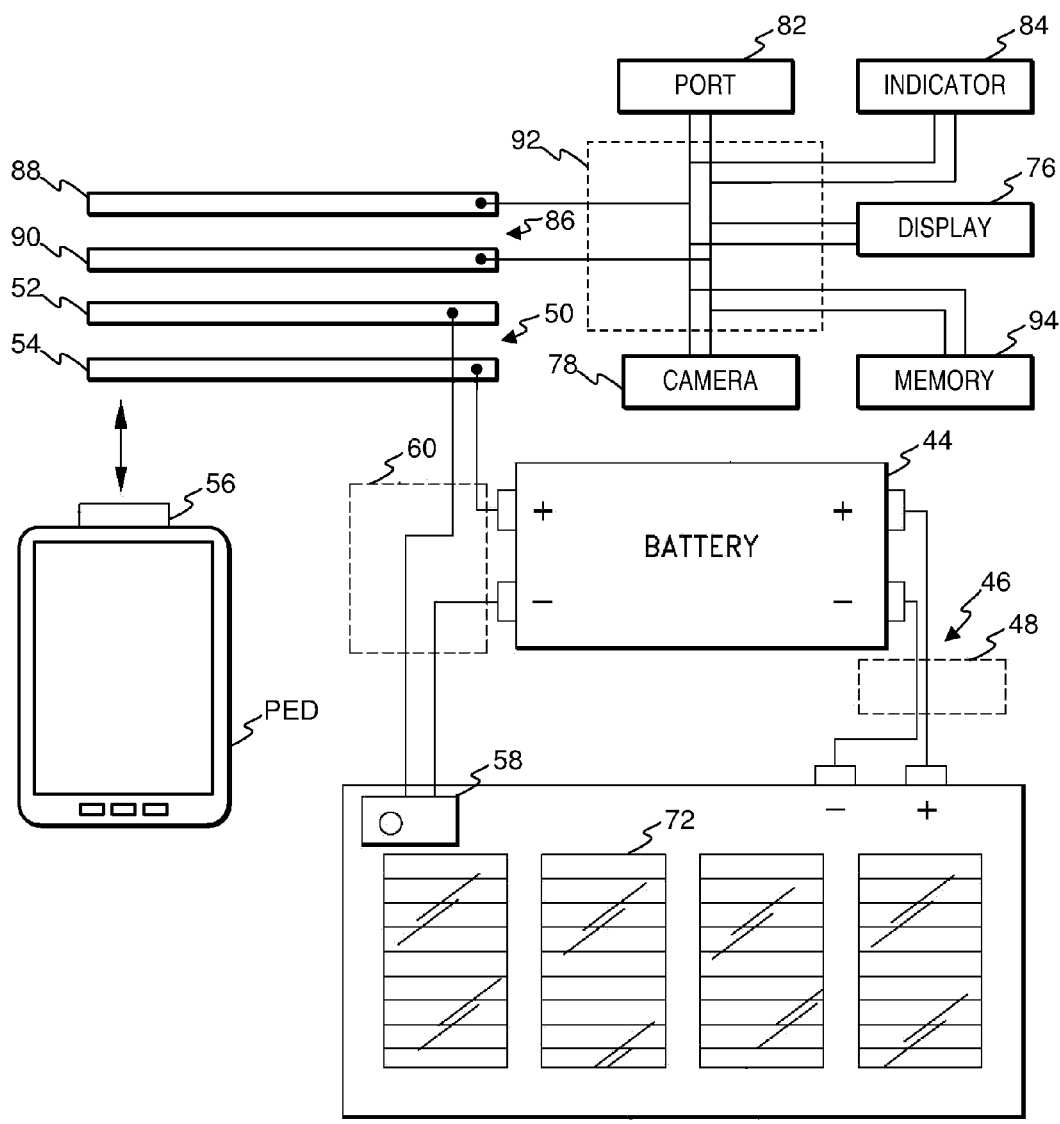
FIG. 10 schematically illustrates a charging system configuration and electronic peripheral system configuration in accordance with an embodiment of the invention.

Referring to FIG. 10, it is noted that a controller 48 may be used to regulate electricity generated by the photovoltaic ink 72 (or other energy collector), and a battery 44 may be used to store electricity and to deliver a stead flow of electricity to a PED such as described above.

In addition to power and charging features, the carrier 20 may also provide other features. Referring to FIGS. 6-7 and FIG. 10 for example, the carrier 20 may include various electronic accessories or peripherals which interface with the PED when the PED is held within the carrier. For example, the carrier 20 may comprise one or more cameras 78 (which camera(s) 78 may collect images and transmit them for storage or display by the PED), indicator lights 84 (to show the charging status of the PED), displays 76 (to display various information such as the charging level of the PED or the like), data/power connectors 82 (such as for connection to other devices, including other power sources), memory devices (such as for storing information such as image data collected by the camera(s) 78), speakers (such as to emit audio from the PED), microphones (to collect audio information for the PED), GPS receivers (to provide location information to the PED), accelerometers (to provide movement information to the PED), or various other sensors. In this manner, once within the carrier 20 a PED may have access to such accessories or peripherals.

FIG. 10 illustrates an exemplary configuration of the carrier's electronics including one or more electronic peripherals as well as the power supply/storage components described above. The peripherals may directly connect to a PED or may connect through one or more components. For example, one or more controllers 92 or the like may be used to facilitate connections between peripherals and a PED. As can be seen, in the embodiment of FIG. 10, one or more ports 82, indicators 96, displays 76, memory devices 94, cameras 78, or other peripherals may be connected via one or more controllers 92. It is noted that a controller 92, peripheral, or both may be powered by the carrier 20 or by the PED with a connection to the appropriate power source. In one embodiment, such devices may be mounted to or supported by the carrier 20.

In one or more embodiments, connections between one or more peripherals and a PED may occur through a docking port 86. The docking port 86 may comprise one or more leads 88,90 which allow a connection between a PED and one or more peripherals and/or a controller 92. The leads 88,90 may be configured to allow the docking port 86 to accept connections from a variety of PEDs. For example, the leads 88,90 may be elongated or wrap around a portion of the interior area 36 like the leads 52,54 of the charging port 50 shown in FIG. 6. An interface 56 may be used to form a connection between the PED and the docking port's leads 88,90 such as described above with regard to the leads of the charging port 50. In some embodiments, the docking port 86 may be configured for one or more particular PEDs. In these embodiments, it is contemplated that the leads 88,90 need not be elongated (or wrap around) as they may be specially configured to connect with a particular PED.

It is contemplated that the leads 52,54 of the charging port 50 and the leads 88,90 of the docking port 86 may be adjacent and that a single interface 56 (or other connector) may be used to connect with both the charging port 50 and the docking port 86. Of course, the docking port 86 and charging port 50 may be remote and have their own connectors/connections in one or more embodiments.

The peripherals may add a variety of functionality or enhancements to a PED. For example, a memory device 94 may increase the storage capacity of the PED. A camera 78 may give the PED the ability to record video and take pictures. One or more displays 76 or indicators 84 may be used to present information such as the time, date, temperature, one or more battery levels, solar energy collection levels, and the like. One or more ports 82 may be used to connect additional peripherals or other devices to the PED via the carrier 20 and allow communication with such peripherals or devices. For example, the PED may be connected to a personal computer via a port 82. As another example, the PED may be connected to external flash or other memory via a port 82. In addition, one or more ports 82 may be used to provide or accept power. For example, the PED may power a device or peripheral through a port 82. Alternatively or in addition, the PED may accept power through a port 82.

The one or more ports 82 may be a variety of standardized and/or proprietary connectors. For example, a port 82 may be a USB, Firewire (Trademark of Apple, Inc.), Ethernet, HDMI (Trademark of HDMI Licensing, LLC), VGA, flash media (e.g., SD (Trademark of Toshiba Corporation), CompactFlash (Trademark of the Compact Flash Association), Memory Stick (Trademark of Sony Corporation)), or other connector. It will be understood that various audio/video or other data input/output ports 82 may be included with the carrier 20.

The peripherals and/or controller 92 may be stored at various locations of the carrier 20. For example, these components may be stored in one or more enclosures attached to or internal to the carrier 20. Referring to FIG. 7 for example, an enclosure 74 has been provided to house/support the components. An enclosure may be attached to an exterior surface of the carrier 20, such as one or more of the carrier's panels 68,70. Alternatively or in addition, an enclosure may be partially or fully embedded into a portion of the carrier 20, such as one or more of the panels 68,70. For example, as shown in FIGS. 8-9, it can be seen that the enclosure 74 may extend from the surface of the carrier 20 in one or more embodiments. Of course, the enclosure 74 may be flush with or beneath the surface of the carrier 20 in some embodiments. In these embodiments, it will be understood that the ports, displays, or other externally accessible parts may extend at least to the surface of the carrier 20 to be accessible/visible.

In some embodiments, at least a portion of the enclosure 74 may be externally accessible. This allows internal components to be maintained, replaced, or upgraded if desired. For example, a battery or memory device may be replaced with one that works or with one of higher capacity.

The "notebook" type configuration of the carrier 20 just described and illustrated in FIGS. 6-10 is particularly suited to supporting generally planar PEDs, such as tablet type PEDs. Such a PED might comprise an iPad device manufactured by Apple, though it might comprise other devices such as planar readers and even non-planar devices.

A particular benefit of the carrier 20 using energy collecting photovoltaic ink is that the profile of the carrier 20 may be limited. In this manner, the thickness of the carrier 20, including the panels 68,70 may be reduced or small in dimension, minimizing the profile of the carrier 20 including a PED, such as when it is in the closed position. As indicated above, use of such a photovoltaic ink also has the advantage that a larger surface area of the carrier may be used to collect energy than could be accomplished by attaching one or more standard silicon-based photovoltaic collection panels.

As with the prior embodiments of the invention, the carrier 20 as described may be configured so that when a PED is associated therewith, the PED is placed into charging position automatically (i.e. by mere location of the PED in the carrier 20, without having to connect wires or connectors manually in order to form a charging connection). Such may be accomplished by placing charging contacts of the PED (or an interface thereto) into communication with charging leads in the carrier 20.

It is noted that the carrier 20 may include additional convenience features in one or more embodiments. For example, one or more shoulder straps, handles, the like, or a combination thereof may be included to allow a user to carry the carrier. The straps or handles may be padded for comfort. The carrier 20 may also provide storage for various items. For example, storage compartments such as in the form of one or more pockets, straps, drawers, holsters, the like, or a combination thereof may be provided to hold PED accessories, such as a flexible Bluetooth or other keyboard, headphones, extra batteries, pointing devices, and power adapters. For example, a small drawer may be provided for headphones while a pocket may be provided for a keyboard. The pockets may be at various locations external or internal to the carrier 20. In addition, it is contemplated that the pockets may be on a shoulder strap or handle of the carrier 20.

FIGS. 11-15 also illustrate a carrier 20 having a foldable or multi-position structure. In this embodiment, the carrier 20 again has a front panel 70 and a rear panel 68. As indicated, the carrier 20 may preferably be placed or moved into different positions, such as by folding or bending at one or more hinges 96 to open and close, such as along the spine portion 69 of the carrier. For example, the front panel 70 and rear panel 68 may rotate relative to one another to allow the carrier 20 to open and close. As discussed above, when opened, the carrier 20 may provide access to a PED, and when closed may enclose the PED, such as to protect the PED.

Figure 11:
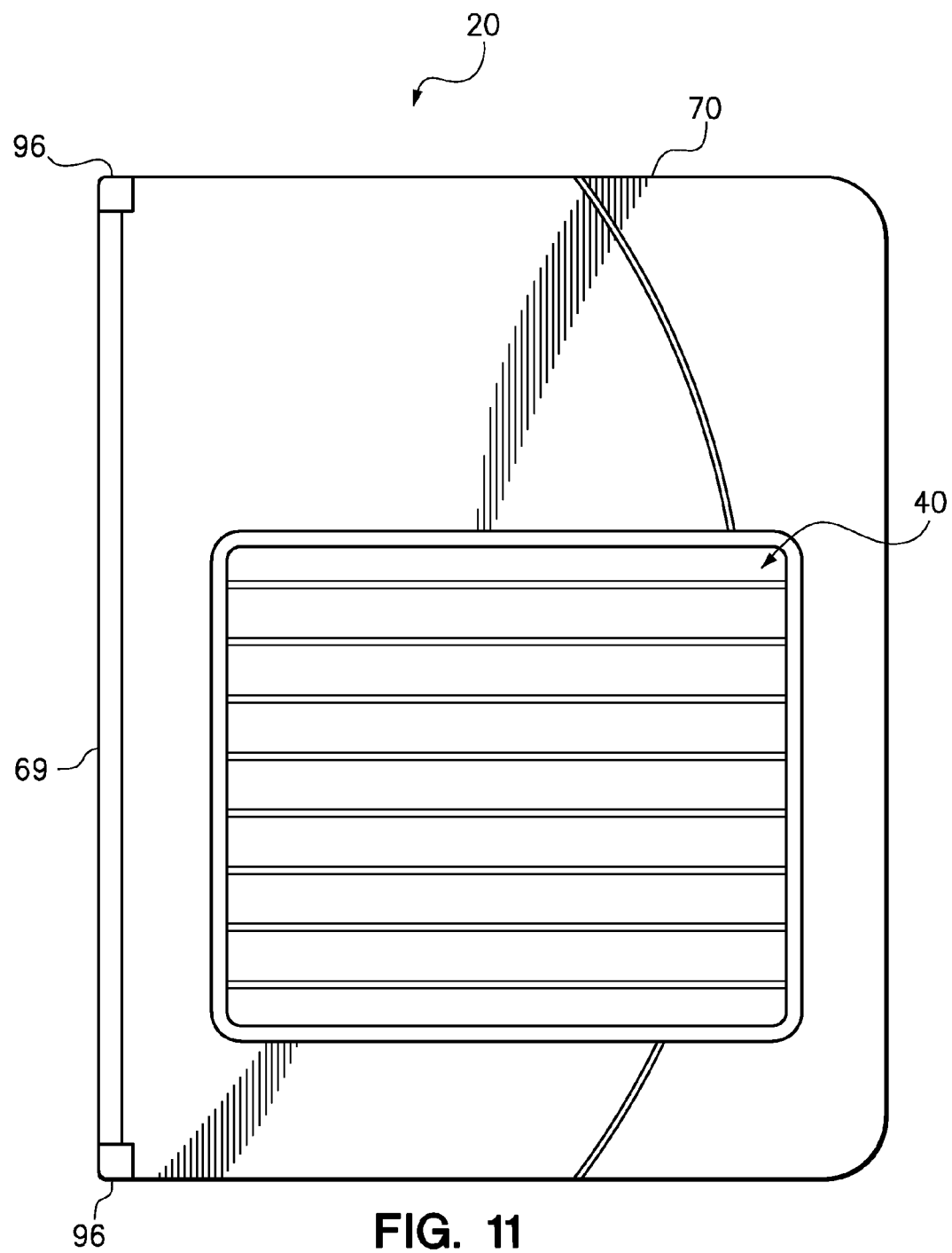
FIG. 11 is a front view of an exemplary portable electronic device carrier.

FIG. 11 is a front view of the carrier 20 showing the exterior side or portion of the front panel 70 (among other things). As can be seen, the carrier 20 may include one or more solar cells 40. As discussed above, the solar cells 40 may convert solar or light energy into electricity, such as to power the PED (or its accessories) or to charge the PED. The electricity may also be used to power various electronic components of the carrier 20. The solar cells 40 may be held by a portion of the front panel 70, such as shown. The solar cells 40 may be held in a recessed portion of the front panel 70. This moves the solar cells 40 away from the surface of the panel 70 thus reducing direct contact with the solar cells, which may damage or dirty the solar cells and reduce their efficiency. For instance, if placed front panel downward on a table or other surface, the recessed portion of the front panel 70 prevents the solar cells 40 from contacting the surface and from becoming scratched, damaged, or dirtied as a result.

As disclosed above, the carrier 20 may also or alternatively be coated with photovoltaic ink to produce electricity from light, and/or the carrier may include one or more batteries to provide electricity. This is highly advantageous in that it extends the battery life and thus the portability of the PED, sometimes greatly. For example, the battery life of a PED could be extended from hours to days, or more with the various power sources provided by the carrier 20.

The carrier 20 may be made from various materials. In one embodiment for example, the carrier may be made from plastic. Other materials, such as rubber, wood, metal, or other rigid or semi-rigid materials may be used. It is contemplated that the materials used may be selected for their ability to absorb shock to protect the PED. The materials may also be moisture proof or resistant to provide durability and long life and easy cleaning/maintenance. It is contemplated that one or more different materials may be used. For example, a rigid material may form the structure of the carrier 20, such as an outer shell, while a softer shock absorbing material forms an interior (or portions of the interior) of the carrier.

Figure 12:
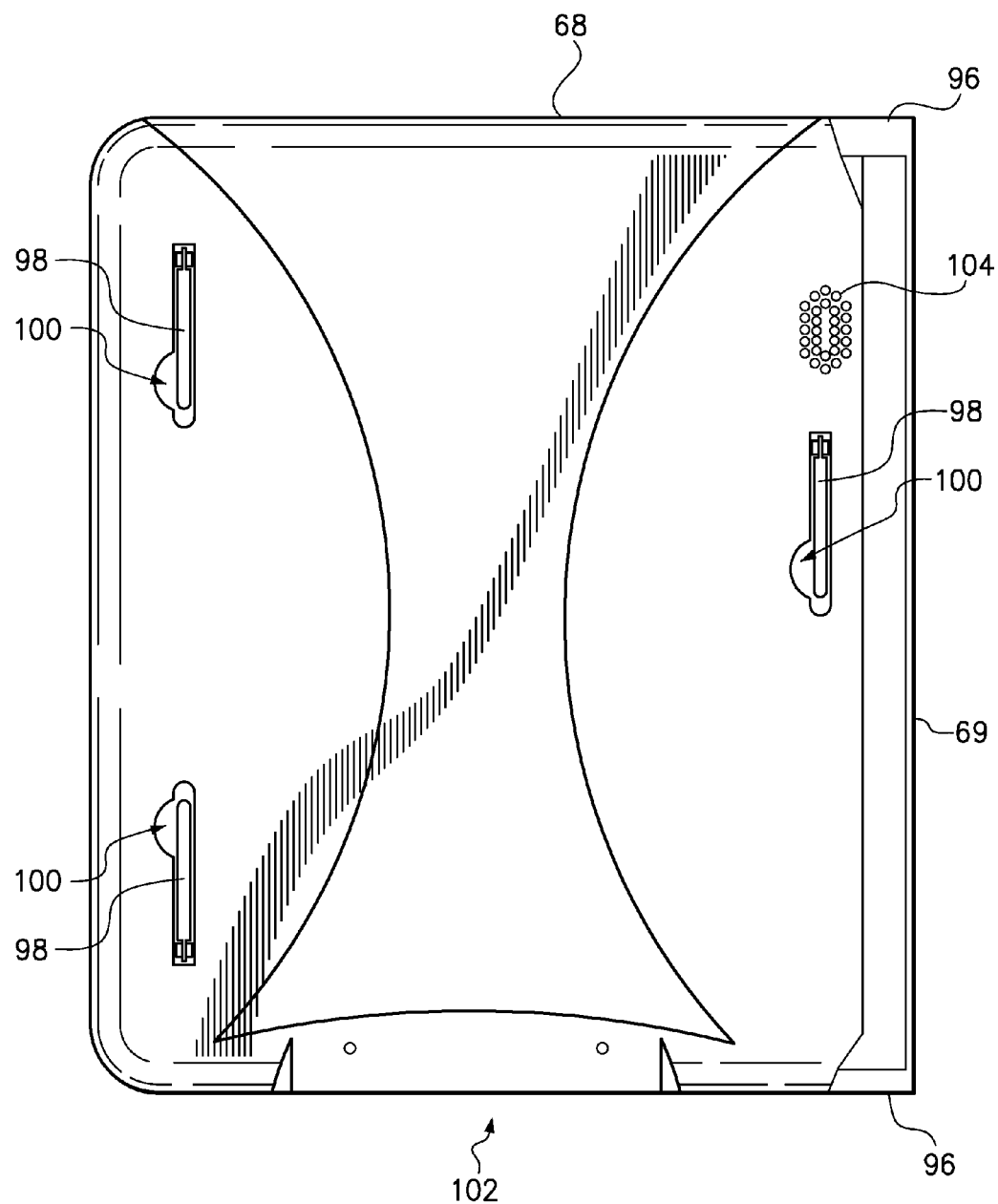
FIG. 12 is a rear view of the portable electronic device carrier of FIG. 11.

FIG. 12 provides a rear or back view of the carrier 20 showing an exterior side or portion of the rear panel 68 (among other things). It is noted that the exterior sides or portions of the front and rear panels may form an exterior surface of the carrier 20. As discussed above, a rear panel 68 may form the back portion of the carrier 20 in one or more embodiments. The rear panel 68 may also include additional elements. For example, as shown, the rear panel includes one or more port mounts 102 that may support one or more data or electrical ports. The rear panel 68 may also comprise a vent 104 to allow movement of air. The vent 104 may be used to allow sound and/or warm/hot air to escape the carrier 20.

In one embodiment, the carrier 20 includes means for retaining the carrier in one or more different positions. Such means might comprise one or more legs or supports. For example, the rear panel 68 could include one or more retractable legs 98 that may be extended to support the rear panel and which may be retracted when not needed. The retractable legs 98 may be held within one or more recesses 100 in the rear panel 68. This prevents the retractable legs 98 from interrupting the generally planar exterior surface of the rear panel 68, such as by protruding outward from the surface when the legs 98 are in their retracted position. As can be seen, the surface of the rear panel 68 may be planar or slightly angled/curved. The recesses 100 allow the retractable legs 98 to not interrupt the surface contours of the rear panel 68. It is noted that the recesses 100 may have an enlarged portion or other means to aid a use in gripping or otherwise moving the legs out of the recesses 100. For example, as shown, the recesses 100 include a semi-circular enlarged area that allows a user easy access to the retractable legs 98. In this manner, a user may easily extend the retractable legs 98 from their retracted position in the recesses 100. For example, a user may use his or her finger to extend one or more of the retractable legs 98.

The retractable legs 98 may have an elongated shape in one or more embodiments. For example, as shown, the retractable legs 98 are elongated cylinders. The legs 98 may have various shapes and lengths which allow the legs to extend outward from the surface of the rear panel 68. In one or more embodiments, the retractable legs 98 may be formed from a rigid material, such as metal, wood, plastic, or other rigid materials. In one embodiment, the retractable legs 98 may be stainless steel such as to withstand exposure to moisture from various sources that may be encountered as the carrier 20 and PED are used.

As can be seen, the retractable legs 98 have been arranged in a triangular pattern on the rear panel 68. Namely, two retractable legs 98 are at a distal side or end of the rear panel 68, while a third retractable leg 98 is at a proximal side or end of rear panel 68 adjacent the hinge 96 of the carrier 20. It is noted that the retractable legs 98 and recesses 100 could be at other locations. In addition, additional or fewer retractable legs 98 and recesses 100 may be provided in some embodiments. One or more retractable legs 98 could also or alternatively be mounted to the front panel in some embodiments. As disclosed below, the illustrated arrangement of legs 98 permits the rear panel 68 to be supported in at least two positions relative to the front panel 70.

Figure 13:
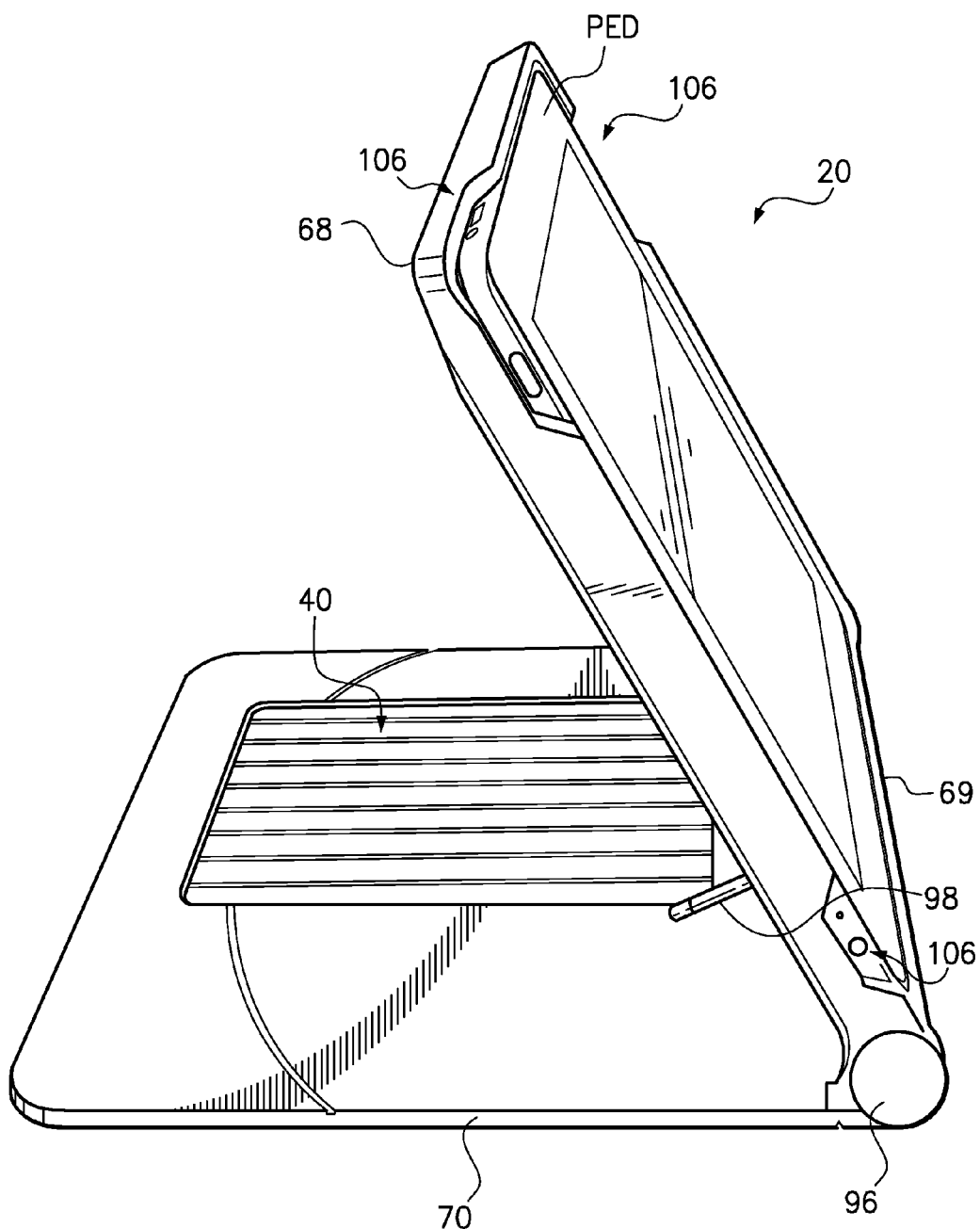
FIG. 13 is a perspective view of the portable electronic device carrier of FIG. 11 in a first open position.
Figure 14:
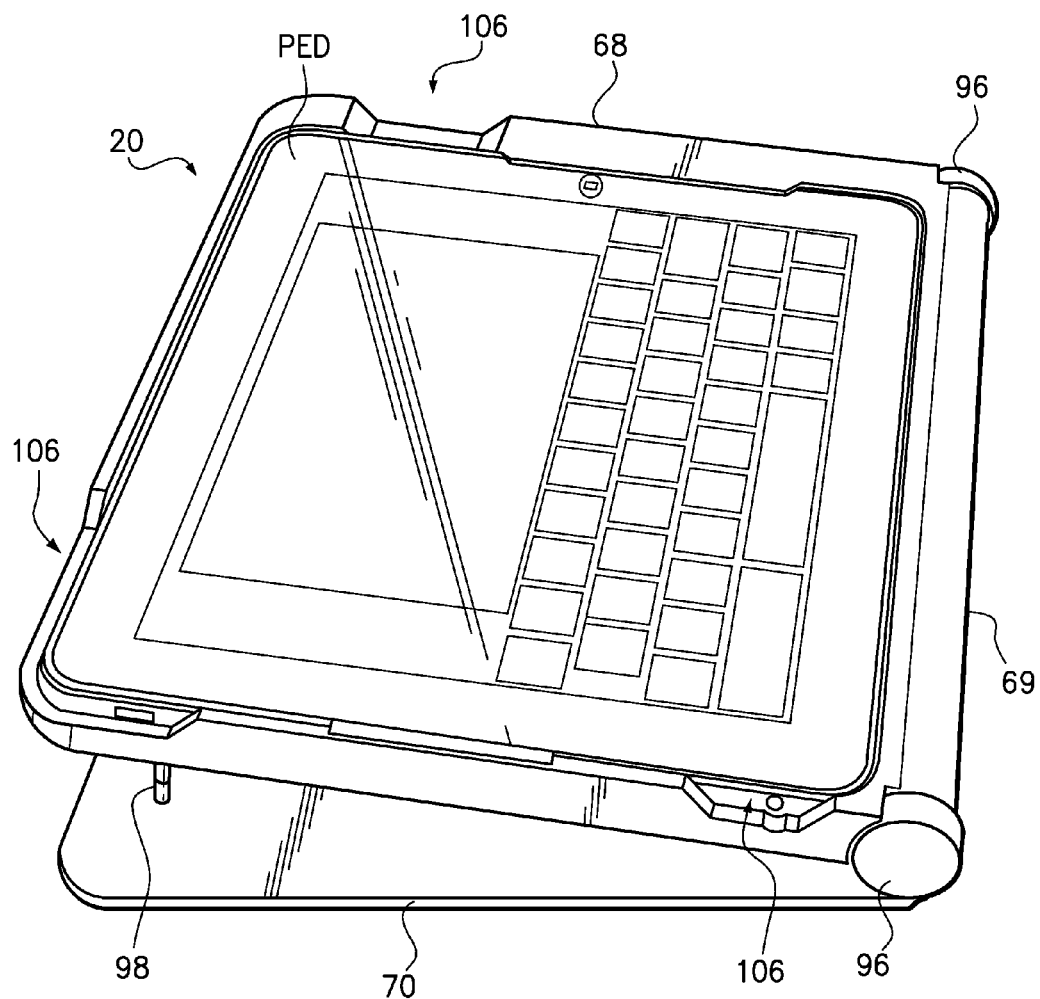
FIG. 14 is a perspective view of the portable electronic device carrier of FIG. 11 in a second open position.

FIGS. 11-12 illustrate the carrier 20 in a closed position where the interior sides or portions of the panels 68,70 are adjacent or are in contact with one another. In the closed position a PED may be enclosed by the panels such as to protect or store the PED therein. FIGS. 13-14 illustrate the carrier 20 in various opened positions. As can be seen from the open view of the carrier 20, the carrier may provide an interior area or depression where a PED may be secured or held within the carrier. For instance, FIGS. 13-14 show a rear panel 68 of the carrier 20 where the PED is held within a depression of the rear panel. Stated another way, the PED is held by the rear panel 68 and is bordered on its sides by portions of the rear panel 68 which extend to surround the PED. It is noted that this border may have one or more openings 106 to allow access to various ports, buttons, controls, inputs, outputs, or other features of the PED.

In FIG. 13, the carrier 20 has been opened to an upright position, like that illustrated in FIG. 9 and described above. As can be seen, a retractable leg 98 near the distal end of the rear panel 68 has been extended outward to support the rear panel in this upright position. In one embodiment, in the upright position, the rear panel 68 may be between 45 and 90 degrees relative to the front panel 70. As can be seen, the carrier 20 may be opened about its spine 69. It is contemplated that the carrier 20 may be opened to varying degrees from fully closed to fully open (e.g., 360 degrees where the front panel 70 and rear panel 68 contact one another). When fully open, the carrier 20 holds the PED like a pad or page, which is highly conducive to reading. As can also be seen, in the upright position, the solar cells 40 remain exposed to any light that may be nearby.

It is noted that the retractable legs 98 may extend and retract in various ways. For example, as shown in FIG. 12, the retractable legs 98 may be rotatably mounted to the rear panel 68. The retractable legs 98 may then be rotated outward to extend and rotated inward (toward the rear panel) to retract. It is contemplated that the retractable legs 98 could also telescope or otherwise extend outward from the rear panel 68, such that they extend beyond the surface of the rear panel.

The front panel 70 and rear panel 68 may be held in position relative to one another, such as in the upright position described above. This is advantageous in that it permits a user to use or work on his or her PED while the PED is positioned at a desired angle. As can be seen, a retractable leg 98 may be extended to hold the front panel 70 and rear panel 68 in position relative to one another. As can be seen from FIG. 13, the retractable leg 98 adjacent the proximal end of the rear panel 68 has been extended such that it contacts the front panel 70. This prevents the rear panel 68 from opening further, and thus holds the rear panel and PED in an upright position. To allow the rear panel 68 to open further, the retractable leg 98 may be retracted.

Typically, the distal end of the retractable leg 98 would not be secured or attached to the front panel 70. As can be seen for example, the retractable leg 98 may have a tip at its distal end that contacts the front panel 70. The tip may be rubberized or padded in some embodiments. It is contemplated that, in other embodiments, the front panel 70 may include a mount, fastener, or the like which removably secures the distal end of the retractable leg 98. This would prevent the rear panel 68 from inadvertently rotating forward or closed. Some exemplary mounts/fasteners include latches, clips, clamps, mating structures, magnets, and hooks. The tip of the retractable leg 98 may include a corresponding structure to attach to a mount/fastener of the front panel 70.

FIG. 14 illustrates the carrier 20 in another open position. As can be seen, the rear panel 68 is less upright in a reclined position, as shown. Typically, a reclined position will be at an angle less than 45 degrees, though various angles may be set. While the upright position of FIG. 13 may be desirable to some users for reading or presenting information from a PED, the reclined position may be desirable for interacting with the PED. For example, the reclined position may be more desirable for inputting text or interacting (e.g., dragging, tapping) with user interface elements.

A reclined position may be achieved in various ways. As shown for example, the retractable legs 98 at the distal end of the rear panel 68 may be extended to support or hold the rear panel at a lower angle than in the upright position. Since the retractable legs 98 at a distal end of the rear panel 68 are being extended, the distance that the rear panel 68 is separated from the front panel 70 is similar to or exactly the length of the retractable legs 98. In the upright position, a retractable leg 98 at the proximal end of the rear panel 68 may be extended. This causes the distal end of the rear panel 68 to be an increased distance away from the front panel 70 (as illustrated in FIG. 13). As disclosed above, the retractable legs 98 may only contact the front panel 70 or may be removably attached to the front panel when the carrier 20 is in the reclined position.

The retractable legs 98 may have various lengths to adjust the position at which they hold the front and rear panels. In one or more embodiments, the retractable legs 98 may all have the same or similar lengths. In such embodiments, the retractable legs 98 may be positioned at different locations to secure or hold the carrier's panels 68,70 at different open positions, such as the upright position and reclined position described above. Alternatively, the retractable legs 98 may have different lengths or a retractable leg may have an adjustable length to hold the panels 68,70 at different open positions.

Though not shown, it is contemplated that multiple retractable legs 98 could be extended. For example, both retractable legs 98 at the distal end of the rear panel 68 shown in FIG. 12 could be extended in the reclined position of FIG. 14. It is noted that the retractable legs 98 could also or alternatively be mounted to the front panel 70, such as in one or more recesses provided on the front panel. The retractable legs 98 may operate as described above if mounted to the front panel 70.

Other means may be provided for retaining the carrier 20 in multiple positions. For example, the front and rear panels 68,70 might be connected by one or more hinges that have lock to stop points. For example, such hinges might permit the rear panel 68 to be rotated to a first position (such as the upright position) and then stopped. A release movement or action may then be required to release the hinge to permit the rear panel 68 to be further rotated to one or more second positions (such as a reclined position), in similar manner. In another embodiment, the front and rear panels 68,70 might include a hinge having a main passage which may be aligned with multiple sub-passages, and where a pin may be moved in and out so as to lock the hinge in different positions of alignment between the main passage and sub-passages.

As can be seen from FIGS. 8-9 and 13-14, the carrier 20 may provide a form fitting covering for a PED. As described above, the carrier 20 may also connect to various data or electrical ports of the PED. For instance, the carrier 20 may have an integrated charging port, such as described above. The charging port may provide power to the PED, such as from an external power source connected to the carrier 20 or from the carrier's solar cells 40 or battery.

The carrier 20 may include other ports as well. For example, referring to FIG. 15, the carrier 20 may include one or more ports 82 for various data and other electrical connections. For instance, in the exemplary embodiment of FIG. 15, the carrier 20 has a port mounting structure 102 that may be used to mount one or more ports 82. As shown, the carrier 20 has a USB port 82A, micro USB port 82B, and an HDMI port 82C. A USB port 82 may be used to provide power to external devices or to accept power. It is noted that various data (including optical) or electrical ports may be provided. For example, a SD card or other memory card slot may be configured as a port 82 that accepts such memory cards.

These ports 82 may be connected to the PED such that connecting a device to these ports 82 connects the device to the PED as though it were connected directly to the PED. For example, the HDMI port 82C may allow video and/or audio to be communicated to or from the PED to an external device, such as a television. It is contemplated that the carrier 20 may include a circuit or processor in some embodiments that translates input/output from one or more of the ports 82 such that it is usable by the PED. Alternatively, at least one port 82 may not be connected to the PED. For example, the carrier 20 may have its own electronic systems that operate with or without the PED. In one embodiment, the carrier may function as a flash drive for instance. Connecting to a USB port 82A may allow access to the carrier 20 as a flash drive for storing or retrieving files.

Figure 16:
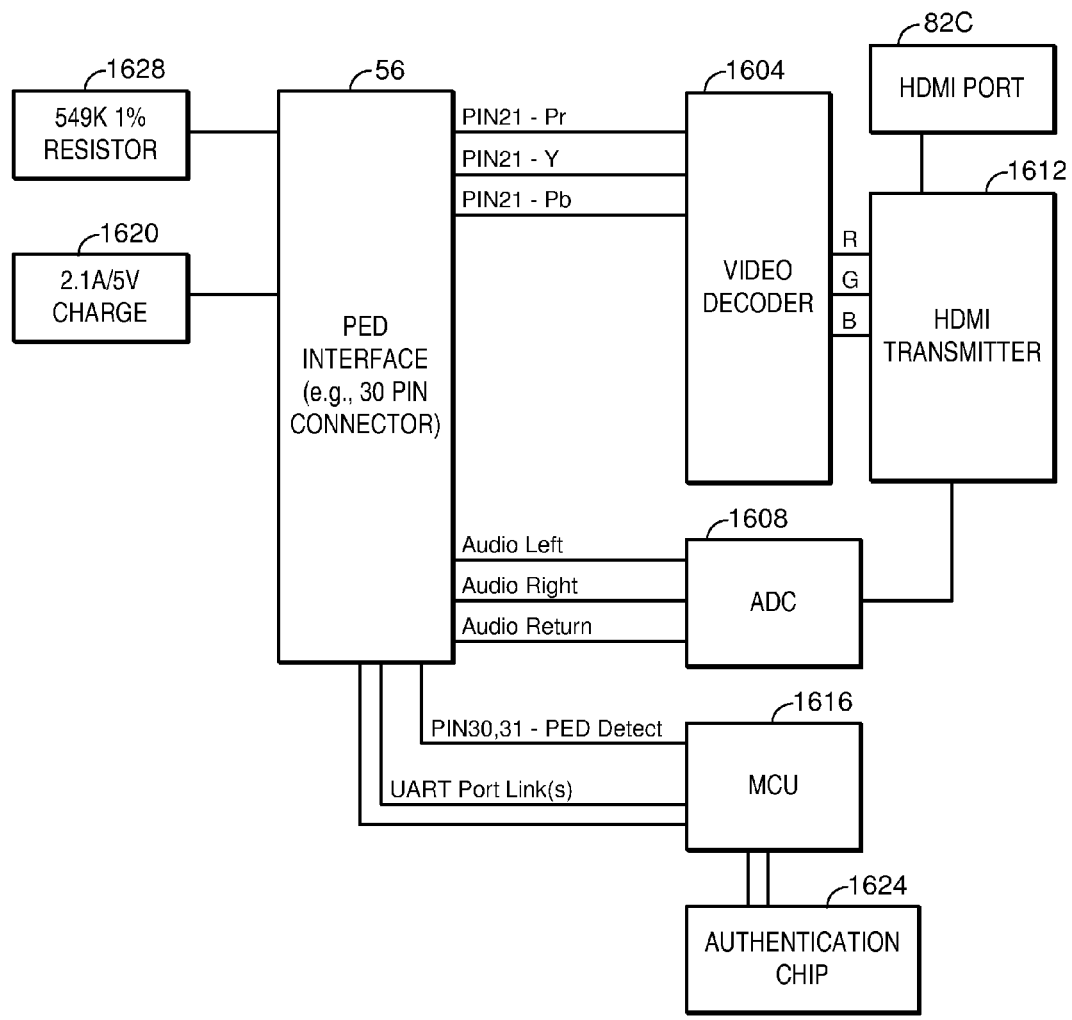
FIG. 16 is a block diagram illustrating an exemplary HDMI output device of a portable electronic device carrier.

In one or more embodiments, an HDMI port 82C may provide HDMI signals via an HDMI output device. FIG. 16 illustrates an exemplary HDMI output device. In general, the HDMI output device may accept an input, such as an audio and/or video signal. The HDMI output device may convert such input into digital audio and video signals that may be used with any HDMI capable device. In other words, the HDMI output device may generate output according to the HDMI standard/format. For example, HDMI output signals may be transmitted to televisions, displays, audio device, or other audio/visual equipment for viewing or listening. Though shown in an analog embodiment, it is contemplated that the HDMI output device may accept a variety of input signals, including analog and digital signals. It is noted that an HDMI output device may not be provided or necessary where a PED has its own HDMI output capabilities.

As can be seen from FIG. 16, the HDMI output device may connect to an interface 56 of a PED that provides audio and/or video output signals. In the embodiment shown, the PED provides YPrPb output as well as audio left and right channel output. Audio signals and video signals may be processed by separate components of the HDMI output device, such as shown. For instance, in the embodiment of FIG. 16, an analog digital converter (ADC) 1608 is provided to accept the analog audio signals from the PED and convert them to a digital signal for HDMI output.

It is contemplated that a video decoder 1604 may be provided to accept various video signals and process them to produce an output. Typically the processing by the video decoder 1604 will result in a signal output that may be understood and used by the HDMI transmitter 1612. For example, as can be seen, a video decoder 1604 may be provided to accept analog YPrPb signals from the PED. The video decoder 1604 may process this video signal and output RGB signals to the HDMI transmitter 1612.

Though shown as separate components (e.g., individual chips, processors, controllers, or the like), it is noted that the ADC 1608 and video decoder 1604 may be a single component, such as a single processor or controller in one or more embodiments. The single component may perform the audio and video processing in the same manner as the ADC 1608 and video decoder 1604 would individually. It is noted that other components of the HDMI output device could also be combined into various multi-function processors, chips, controllers, or the like.

As can be seen, the HDMI transmitter 1612 may accept audio and/or video input signals and produce HDMI output according to the HDMI standard. This permits the HDMI output to be used with any HDMI compatible device. In general, the HDMI transmitter 1612 may alter signal timings and voltages (among other things) to produce output according to the HDMI standard. The HDMI transmitter 1612 may also determine or set one or more characteristics of the audio and/or video being outputted. For example, the HDMI transmitter 1612 may communication video resolution, frame rate, audio resolution, audio sample rate, or the like to an external HDMI device (e.g., television, stereo, etc. . . . ). The output of the HDMI transmitter 1612 may be sent via the HDMI port 82C, such as shown.

Though described above with regard to HDMI, it is noted that other video and audio signals could be generated, such as by providing a different transmitter 1612 or by instructing the transmitter 1612 to output signals according to other formats. This permits other analog or digital signals to be produced for use with external devices with various input capabilities.

It is noted that some PEDs may require confirmation, authorization, or other "handshaking" signal(s) before they will output video and/or audio signals. One or more components to provide such communication to allow audio/video output from a PED may be included. For example, an HDMI output device may include a microcontroller (MCU) 1616 configured to communicate with a PED. As can be seen, various links may be formed between the PED and MCU 1616 for such communications. For example, in FIG. 16, the MCU 1616 may communicate via one or more UART port links. In addition, the MCU 1616 may have one or more probe lines to detect various pin connections which may identify a particular PED from other PEDs.

In one or more embodiments, the MCU 1616 may identify the HDMI output device as a valid device for accepting video and/or audio output form the PED. In addition, the MCU 1616 may accept information from a PED, such as to determine what model or type of PED is connected to the MCU or HDMI output device. Operation of the HDMI output device may (or may not) be enabled or disabled based on the model or type of PED detected by the MCU 1616, in some embodiments.

In one or more embodiments, an authentication chip 1624 may be used to verify to the PED that an attached device or accessory, such as the HDMI output device, has been authorized/certified for use with the PED. The authentication chip 1624 may communicate with the PED via the PED's interface 56. For example, as shown, the authentication chip 1624 communicates authentication information with the PED through the MCU 1616. In operation, the MCU 1616 may facilitate communication between the PED and authentication chip 1624 to verify that the HDMI output device is certified or authorized for use with the PED (where the PED requires such certification or authorization). It is noted that, in some embodiments, the PED may not recognize or provide output to the HDMI output device without such certification or authorization.

In some embodiments, the HDMI output device may notify or inform the PED that it is present. For example, a signal or the like may be transmitted from the HDMI output device to the PED to inform the PED of the HDMI output devices presence. In one embodiment, a resistor 1628, such as the 549K 1% resistor shown, may be used. This resistor 1628 may identify the HDMI output device (or other accessory) to the PED. Upon detecting the value of the resistor 1628, the PED may then identify and subsequently use the HDMI output device. In some embodiments, if the PED does not receive a proper identification or notification signal, it may not be aware of or use the HDMI output device. It is contemplated that various resistors besides the 549K 1% resistor shown may be used.

Figure 15:
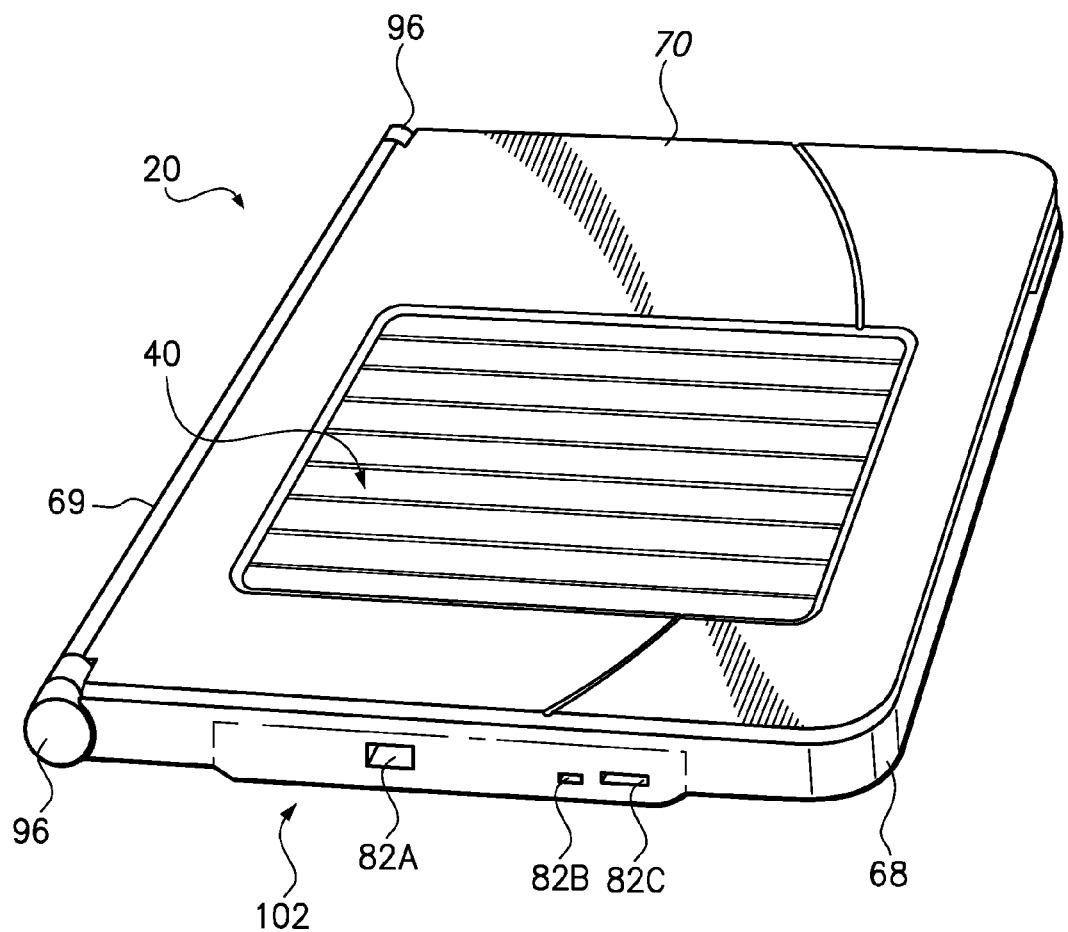
FIG. 15 is a front perspective view of the portable electronic device carrier of FIG. 11.

Referring to FIGS. 13-15, the HDMI output device, when provided, will typically be held within the carrier 20 in one or more embodiments. For example, the HDMI output device or components thereof may be in the front panel 70 and/or rear panel 68 of the carrier 20. Components or the entire HDMI output device may also or alternatively be within the spine of the carrier 20 in some embodiments. This is beneficial in that it allows the HDMI output device to be transported with the PED and carrier 20. This allows a user to have HDMI output capability (along with the other benefits of the carrier 20) wherever he or she is.

It is noted that one or more electrical leads or conduits/connections may couple the HDMI output device to an HDMI port 82C of the carrier 20 and/or to a battery, solar panel, or other power source of the carrier. For example, as shown in FIG. 16, electrical power may be provided to the PED and/or the HDMI output device by coupling the PED and/or HDMI output device to a power source 1620 (e.g., battery, solar panel, photovoltaic ink) at the PED's interface 56. It is contemplated that the HDMI output device may alternatively or also be powered by a separate connection to a power source 1620 or by the PED, such as a power output provided by a PED's interface 56.

Other video/audio input and output capabilities may be provided by a carrier 20 as well. For example, a DTV tuner may be provided to allow a PED to receive and present digital television to a user. The PED may also process, record, or otherwise manipulate DTV signals. A pico-projecter may also be provided in some embodiments, such as to allow video output from a PED to be presented in a large format, such as on a presentation wall, screen, or the like. This would be advantageous in displaying presentations to an audience, such as one or more slide presentations, videos, or the like. The DTV tuner and/or pico-projector may be held by or within the carrier 20, such as at or in a panel, spine, or both of the carrier.

The carrier 20 may include various other features. For example, a locator may be provided. The locator may help the user find the carrier 20. The locator may comprise a microphone and speaker along with accompanying circuitry in one or more embodiments. Upon detecting sounds of a certain type, pitch, tone, and/or length, the locator may respond by producing audible sounds through its speaker. For example, the locator may be configured to detect a whistle sound and respond by producing a beep or other sound that allows a user to locate the carrier 20.

It is contemplated that the carrier 20 may also provide wireless communications capabilities. For example, near field communications (NFC) capabilities may be provided by one of more NFC transmitters and/or receivers held within or by the carrier 20. Such transmitters and receivers may be coupled with the PED via an interface, such as described above. NFC capabilities would be beneficial in allowing the PED to communicate various data with nearby electronic devices.

The carrier 20 may have various colors and textures. For example, it is contemplated that the carrier 20 may have a 2-tone color in one or more embodiments to match that of sports teams, schools, or the like. One of the two colors may be produced by photovoltaic ink in some embodiments. The carrier 20 may also have a carrying case having an opening or transparent/translucent area(s) to allow light to reach the carrier so that the carrier may produce electricity. The carrying case may include one or more pockets, handles, straps, or the like to make the carrier 20 more easy to carry, even when a user's hands are occupied with other tasks.

In accordance with the invention, the carrier 20 may advantageously be used to protect the PED, permit the PED to be moved into different positions for use, charge or power the PED, and permit connection of various other devices with the PED. In one embodiment, for example, the carrier 20 including the solar charger may extend the usable time of the PED from around 10 hours to 9.5 days on average (based upon average use and lighting conditions which permit the PED to be charged by the carrier 20).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A portable electronic device carrier comprising:
   a foldable structure comprising a first panel and a second panel, wherein the first panel and second panel are rotatable between a closed position and one or more open positions relative to one another, whereby, in the closed position, an interior side of the first panel is adjacent an interior side of the second panel;
   an interior recess in at least one of the two panels configured to accept the portable electronic device therein;
   an exterior surface comprising the exterior side of the first panel and the exterior side of the second panel;
   one or more solar panels mounted to the exterior surface;
   at least one charging port at the interior recess and electrically coupled to the one or more solar panels, the at least one charging port configured to provide electricity to the portable electronic device; and
   one or more retractable legs mounted to the exterior surface, the one or more retractable legs configured to extend and retract from the exterior surface.

2. The portable electronic device carrier of claim 1, wherein at least one of the one or more retractable legs is mounted to the exterior surface at the proximal end of the second panel.

3. The portable electronic device carrier of claim 1, wherein at least one of the one or more retractable legs is mounted to the exterior surface at the distal end of the second panel.

4. The portable electronic device carrier of claim 1, wherein the one or more retractable legs are each mounted within a recess in the exterior surface.

5. The portable electronic device carrier of claim 1, wherein the one or more retractable legs are rotatably mounted to the exterior surface such that the one or more retractable legs may rotate from a retracted position wherein the one or more retractable legs are adjacent the exterior surface and to an extended position wherein the one or more retractable legs extend outward from the exterior surface.

6. The portable electronic device carrier of claim 1, wherein the at least one charging port is positioned at a wall of the interior recess such that the at least one charging port is automatically coupled with an interface of the portable electronic device as the portable electronic device is inserted into the interior recess.

7. The portable electronic device carrier of claim 1 further comprising an audio and video output device coupled to the interface of the portable electronic device via the at least one charging port, the audio and video output device configured to accept audio and video signals from the PED and output a digital audio and video signals therefrom that conforms to the HDMI standard.

8. A method for supporting and powering a portable electronic device with a portable electronic device carrier comprising:
providing a foldable structure comprising a first panel and a second panel wherein the first panel and second panel are rotatable between a closed position and one or more open positions relative to one another, whereby, in the closed position, an interior side of the first panel is adjacent an interior side of the second panel;
forming an interior recess in at least one of the two panels, the interior recess configured to accept the portable electronic device therein;
mounting one or more solar panels to an exterior surface of at least one of the two panels;
providing at least one charging port at the interior recess;
electrically coupling the at least one charging port to the one or more solar panels; and
mounting one or more retractable legs to the exterior surface of at least one of the two panels, the one or more retractable legs configured to extend and retract from the exterior surface.

9. The method of claim 8 further comprising:
extending at least one of the one or more retractable legs; and
moving the at least one of the one or more retractable legs such that both ends of the at least one of the one or more retractable legs are in contact with at least one of the two panels, wherein the at least one of the one or more retractable legs hold the two panels at a fixed position relative to one another.

10. The method of claim 9, wherein moving the at least one of the one or more retractable legs comprises rotating the first panel relative to the second panel such that the first panel and the second panel are in a non-parallel angle relative to one another.

11. The method of claim 9, wherein extending the at least one of the one or more retractable legs comprises extending a retractable leg at a proximal end of at least one of the two panels to hold the two panels at a first open position relative to one another.

12. The method of claim 11, wherein extending the at least one of the one or more retractable legs comprises extending a retractable leg at a distal end of at least one of the two panels to hold the two panels at a second open position relative to one another, the second open position distinct from the first open position.

13. The method of claim 8 further comprising communicating data with a memory device from the portable electronic device via the at least one charging port, the memory device mounted to at least one of the two panels.

\* \* \* \* \*